US012062828B2

(12) United States Patent
Kufa et al.

(10) Patent No.: US 12,062,828 B2
(45) Date of Patent: Aug. 13, 2024

(54) RESONANT CAVITY FILTER COMPRISING A DIELECTRIC RESONATOR MOUNTED TO A CONDUCTIVE HOUSING BY A DIELECTRIC FASTENER LOCATED WITHIN A LONGITUDINAL BORE OF THE DIELECTRIC RESONATOR

(71) Applicant: CommScope Italy, S.R.L., Agrate Brianza (IT)

(72) Inventors: Martin Kufa, Pardubice (CZ); Lukáš Matrka, Pardubice (CZ); Frantisek Ondracek, Pardubice (CZ); Jaromir Peroutka, Pardubice (CZ); Giuseppe Resnati, Seregno (IT)

(73) Assignee: CommScope Italy, S.R.L., Agrate Brianza (IT)

( * ) Notice: Subject to any disclaimer, the term of this patent is extended or adjusted under 35 U.S.C. 154(b) by 0 days.

(21) Appl. No.: 18/311,665

(22) Filed: May 3, 2023

(65) Prior Publication Data

US 2023/0275335 A1 Aug. 31, 2023

Related U.S. Application Data

(63) Continuation of application No. 17/529,615, filed on Nov. 18, 2021, now Pat. No. 11,682,820.

(30) Foreign Application Priority Data

Nov. 19, 2020 (IT) ........................ 102020000027735

(51) Int. Cl.
*H01P 7/10* (2006.01)
*H01P 1/207* (2006.01)
(Continued)

(52) U.S. Cl.
CPC ................ *H01P 7/10* (2013.01); *H01P 1/207* (2013.01); *H01P 1/2084* (2013.01); *H01P 3/12* (2013.01)

(58) Field of Classification Search
CPC ................................ H01P 1/2084; H01P 7/10
(Continued)

(56) References Cited

U.S. PATENT DOCUMENTS 4,963,841 A 10/1990 Sparagna
5,097,238 A 3/1992 Sato et al.
(Continued)

FOREIGN PATENT DOCUMENTS

CN 101924261 A 12/2010
CN 106505282 A 3/2017
(Continued)

OTHER PUBLICATIONS

"Notification of Transmittal of the International Search Report and the Written Opinion of the International Searching Authority, or the Declaration for corresponding International Application No. PCT/US2021/081121, mailing date: Feb. 22, 2022, (14 pages)".

*Primary Examiner* — Benny T Lee
(74) *Attorney, Agent, or Firm* — Myers Bigel, P.A.

(57) ABSTRACT

Resonant cavity filters include a conductive housing having a floor. A dielectric resonator is mounted to extend upwardly from the floor. The dielectric resonator has a cylindrical body with a longitudinal bore that defines an inner sidewall. The longitudinal bore has a variable transverse cross-sectional area. A threaded dielectric fastener is at least partially inserted within the longitudinal bore of the cylindrical body.

19 Claims, 21 Drawing Sheets

(51) Int. Cl.
*H01P 1/208* (2006.01)
*H01P 3/12* (2006.01)

(58) Field of Classification Search
USPC ............................................... 333/202, 219.1
See application file for complete search history.

(56) References Cited

U.S. PATENT DOCUMENTS

| | | | |
|---|---|---|---|
| 6,002,311 A | 12/1999 | Wey et al. | |
| 6,414,571 B1 | 7/2002 | Hunter et al. | |
| 6,535,086 B1 | 3/2003 | Liang et al. | |
| 11,682,820 B2 * | 6/2023 | Kufa et al. ................ | H01P 7/10 333/208 |
| 2006/0145788 A1 | 7/2006 | Jedrzejewski et al. | |
| 2015/0061793 A1 | 3/2015 | Zhou | |
| 2017/0207509 A1 | 7/2017 | Yoon et al. | |

FOREIGN PATENT DOCUMENTS

| | | |
|---|---|---|
| EP | 2933876 A1 | 10/2015 |
| KR | 101357027 B1 | 2/2014 |

* cited by examiner

RESONANT CAVITY FILTER COMPRISING A DIELECTRIC RESONATOR MOUNTED TO A CONDUCTIVE HOUSING BY A DIELECTRIC FASTENER LOCATED WITHIN A LONGITUDINAL BORE OF THE DIELECTRIC RESONATOR

CROSS-REFERENCE TO RELATED APPLICATION

This application is a continuation application of U.S. patent application Ser. No. 17/529,615, filed Nov. 18, 2021, now U.S. Pat. No. 11,682,820, issued on Jun. 20, 2023, which claims priority to Italian Patent Application No. 102020000027735, filed on Nov. 19, 2020, the disclosures of which are incorporated herein by reference in their entireties.

FIELD

The present invention relates generally to communications systems and, more particularly, to resonant cavity filters that are suitable for use in communications systems.

BACKGROUND

Resonant cavity filters and, in particular, resonant cavity filters having coaxial resonators, are used widely in wireless communications systems such as cellular communications systems and in-building distributed antenna systems. For example, resonant cavity filters are commonly used to implement low-pass filters, high-pass filters, band-stop filters, band-pass filters, duplexers, diplexers, and the like. Low-pass, high-pass, band-stop and band-pass filters are all two port devices that are designed to substantially pass portions of the RF signals input thereto that are within a pass-band frequency range of the filter while substantially blocking (e.g., reflecting backward) portions of the RF signals input thereto that are outside of the pass-band frequency range of the filter. A duplexer is a three-port device that includes two filters (an uplink filter and a downlink filter) that are connected to a "common" port (where the common port is typically connected to an antenna). Thus, a duplexer may be used to connect both the transmit and receive ports of a radio to an antenna or to one or more radiating elements of a multi-element antenna. Duplexers are used to isolate the RF transmission paths to the transmit and receive ports of the radio from each other while allowing both RF transmission paths access to the radiating element(s) of the antenna. A diplexer is another three-port device that includes an uplink filter or a downlink filter that are connected to a common port (that again is typically connected to an antenna). A diplexer is used to connect ports on two different radios that operate in different frequency bands to an antenna or to one or more radiating elements of a multi-element antenna. Diplexers may be used to pass RF signals from both radios to the radiating element(s) of the antenna for transmission, and to direct RF signals that are received at the radiating element(s) of the antenna to the appropriate radio based on frequency. Multiplexers are also known in the art that include more than three ports (e.g., "X" ports) that may be used, for example, to connect X different ports to an antenna or to one or more radiating elements of a multi-element antenna.

Electromagnetic waves may propagate within resonant cavity filters with different dominant propagation modes, including the transverse electromagnetic (TEM) mode, the transverse magnetic (TM) mode and/or the transverse electric (TE) mode. TM and TE mode propagation may be at the fundamental modes (designated as the $TM_{01}$ or $TE_{01}$ modes) or at higher modes. Resonant cavity filters are typically designed so that one mode is dominant, and the total power of any non-dominant modes may be multiple decibels below the power of the dominant mode. Resonant cavity filters that are designed to have the $TM_{01}$ mode as the dominant mode may include $TM_{01}$ mode dielectric resonators, which may be smaller and lighter than metal coaxial resonators and may exhibit lower insertion losses.

SUMMARY OF THE INVENTION

Pursuant to embodiments of the present invention, resonant cavity filters are provided that include a conductive housing having a floor, a dielectric resonator mounted to extend upwardly from the floor, the dielectric resonator comprising a cylindrical body with a longitudinal bore that defines an inner sidewall, the longitudinal bore having a variable transverse cross-sectional area, and a threaded dielectric fastener that is at least partially within the longitudinal bore of the cylindrical body.

In some embodiments, the dielectric resonator has an inwardly extending protrusion. In some embodiments, the protrusion is adjacent a lower end of the dielectric resonator. The protrusion includes an internal bore, and the threaded dielectric fastener extends through the internal bore of the protrusion. The protrusion may or may not be spaced apart from a bottom of the dielectric resonator.

In some embodiments, the threaded dielectric fastener comprises a bolt or a screw. In some embodiments, the floor may include a threaded opening, and the threaded dielectric fastener is threadably mated with the threaded opening in the floor. In other embodiments, the floor may include an opening that is aligned with the longitudinal bore, and the threaded dielectric fastener is threadably mated with a second threaded fastener to capture the protrusion between the floor and one of the threaded dielectric fastener and the second threaded fastener. In some embodiments, the conductive housing further may include an upwardly extending post that is integral with the floor. The upwardly extending post may, for example, be externally-threaded, and the threaded dielectric fastener may comprise a dielectric nut that is threadably mated with the upwardly extending post to capture the protrusion between the dielectric nut and the floor. The upwardly extending post may alternatively be an internally-threaded, and the threaded dielectric fastener may comprise a dielectric bolt or screw that is threadably mated with the upwardly extending post to capture the protrusion between the dielectric bolt or screw and the floor.

In some embodiments, the threaded dielectric fastener may be an internally-threaded nut.

In some embodiments, the cylindrical body of the dielectric resonator may comprise a first cylindrical body with a first longitudinal bore that has a first transverse cross-sectional area and a second cylindrical body that has a second transverse cross-sectional area that is less than the first transverse cross-sectional area, the second cylindrical body being adhered to the first cylindrical body.

In some embodiments, an inner sidewall of the dielectric resonator that defines the longitudinal bore may comprise a tapered sidewall having a circular cross-section of varying area.

In some embodiments, a bottom surface of the dielectric resonator directly contacts the floor.

The resonant cavity filters may include a tuning element that is mounted for insertion into an interior of the dielectric resonator to adjust a frequency response of the resonant cavity filter.

The resonant cavity filter may comprise, for example, a duplexer or a diplexer.

Pursuant to further embodiments of the present invention, resonant cavity filters are provided that include a conductive housing having a floor, at least one sidewall and a lid that define a cavity, a threaded fastener that extends upwardly from the floor to extend into the cavity, where the threaded fastener and the floor comprise a monolithic structure, and a dielectric resonator that is mounted to extend upwardly from the floor via the threaded fastener. A bottom surface of the dielectric resonator directly may contact the floor.

The threaded fastener may be an externally-threaded fastener.

In some embodiments, the resonant cavity filter may further include an internally-threaded dielectric fastener that is threadably-mated with the externally-threaded fastener. The dielectric resonator may comprise a cylindrical body with a longitudinal bore that defines an inner sidewall and a protrusion that extends inwardly from the inner sidewall, and the protrusion may be between the internally-threaded dielectric fastener and the floor.

In some embodiments, the resonant cavity filter may further include an internally-threaded dielectric fastener and the resonant cavity filter further includes an externally-threaded dielectric fastener that is threadably-mated with the internally-threaded fastener.

The dielectric resonator may comprise a cylindrical body with a longitudinal bore that defines an inner sidewall and a protrusion that extends inwardly from the inner sidewall. The protrusion may be between the externally-threaded dielectric fastener and the internally-threaded fastener.

In other embodiments, the dielectric resonator may comprise a cylindrical body with a longitudinal bore that has a tapered sidewall, and the resonant cavity filter further comprises an externally-threaded dielectric fastener, and the externally-threaded dielectric fastener engages the tapered sidewall. A head of the threaded fastener may have tapered sidewalls.

Pursuant to still further embodiments of the present invention, resonant cavity filters are provided that include a conductive housing having a floor, at least one sidewall and a lid, and a dielectric resonator mounted to extend upwardly from the floor via a threaded dielectric fastener, the dielectric resonator directly contacting the floor.

The dielectric resonator may have an inwardly extending protrusion. The protrusion may include an internal bore, and the threaded dielectric fastener may extend through the internal bore of the protrusion.

The threaded dielectric fastener may be, for example, a bolt, a screw or an internally-threaded nut. The floor may include a threaded opening, and the threaded dielectric fastener may be threadably mated with the threaded opening in the floor. Alternatively, the floor may include an opening that is aligned with a longitudinal bore of the dielectric resonator, and the threaded dielectric fastener may be threadably mated with a second threaded fastener to capture the protrusion between the floor and one of the threaded dielectric fastener and the second threaded fastener.

In some embodiments, the conductive housing may include an upwardly extending post that is integral with the floor. In such embodiments, the upwardly extending post may be externally-threaded, and the threaded dielectric fastener may comprise a dielectric nut that is threadably mated with the upwardly extending post to capture the protrusion between the dielectric nut and the floor. In other cases, the upwardly extending post may be internally-threaded, and the threaded dielectric fastener may comprise a dielectric bolt or screw that is threadably mated with the upwardly extending post.

In some embodiments, the dielectric resonator may comprise a first cylindrical body with a first longitudinal bore that has a first transverse cross-sectional area and a second cylindrical body that has a second transverse cross-sectional area that is less than the first transverse cross-sectional area, the second cylindrical body being adhered to the first cylindrical body.

In some embodiments, a longitudinal bore of the dielectric resonator has a tapered sidewall having a circular cross-section of varying area.

Pursuant to still further embodiments of the present invention, methods of forming a resonant cavity filter are provided. Pursuant to these methods, a conductive housing for the resonant cavity filter is die cast, the conductive housing including a floor and at least one sidewall that are formed as a monolithic structure, where the floor is die cast to include a plurality of raised islands that are surrounded by respective recessed regions. A planarizing operation is then performed to reduce a height of each of the plurality of raised islands so that an upper surface of each island is coplanar with the recessed region surrounding the respective island.

A threaded dielectric fastener may be used to mount a dielectric resonator to extend upwardly from the floor, the dielectric resonator comprising a cylindrical body with a longitudinal bore that defines an inner sidewall, the longitudinal bore having a variable transverse cross-sectional area, where the threaded dielectric fastener is at least partially within the longitudinal bore of the cylindrical body.

The conductive housing may further include a threaded fastener that extends upwardly from the floor that is integral with the floor, the method further comprising using the threaded fastener to mount a dielectric resonator to extend upwardly from the floor.

DETAILED DESCRIPTION OF THE INVENTION

One important consideration in the design of a resonant cavity filter that includes $TM_{01}$ mode dielectric resonators is mounting the dielectric resonators within the cavity in a manner that does not substantially affect the unloaded quality factor or "Qu-factor" of the filter. The Qu-factor of a filter is a dimensionless parameter that is a measure of the selectivity of the filter response. A filter with a high Qu-factor has a very selective response and a very low insertion loss (since the Qu-factor directly impacts the insertion loss), both of which are desirable.

Another important consideration in the design of a resonant cavity filter that includes $TM_{01}$ mode dielectric resonators is mounting the dielectric resonators within the cavity in a way that reduces or minimizes the risk that the filter will become a source of Passive Intermodulation ("PIM") distortion. PIM distortion is a well-known effect that may occur when multiple RF signals are transmitted through a communications system and encounter non-linear electrical junctions or materials along the RF transmission path. Such non-linearities may act like a mixer causing new RF signals to be generated at mathematical combinations of the original RF signals. If the newly generated RF signals fall within the bandwidth of existing RF signals, the noise level experienced by those existing RF signals is effectively increased. When the noise level is increased, it may be necessary to reduce the data rate and/or the quality of service. PIM distortion is an important interconnection quality characteristic for an RF communications system, as PIM distortion generated by a single low-quality interconnection may degrade the electrical performance of the entire RF communications system.

Conventional resonant cavity filters that include $TM_{01}$ mode dielectric resonators mount the dielectric resonators on pedestals using soldered connections. Unfortunately, it may be difficult to control the quality of the solder joints that are used to mount the resonators, even when automated soldering processes are used. As such, one or more of the solder joints within a conventional resonant cavity filter may form an inconsistent metal-to-metal connection that may give rise to PIM distortion. Additionally, the metal pedestals tend to degrade the Qu-factor of the filter and hence undesirably increase the insertion loss of the filter.

Figure 1:
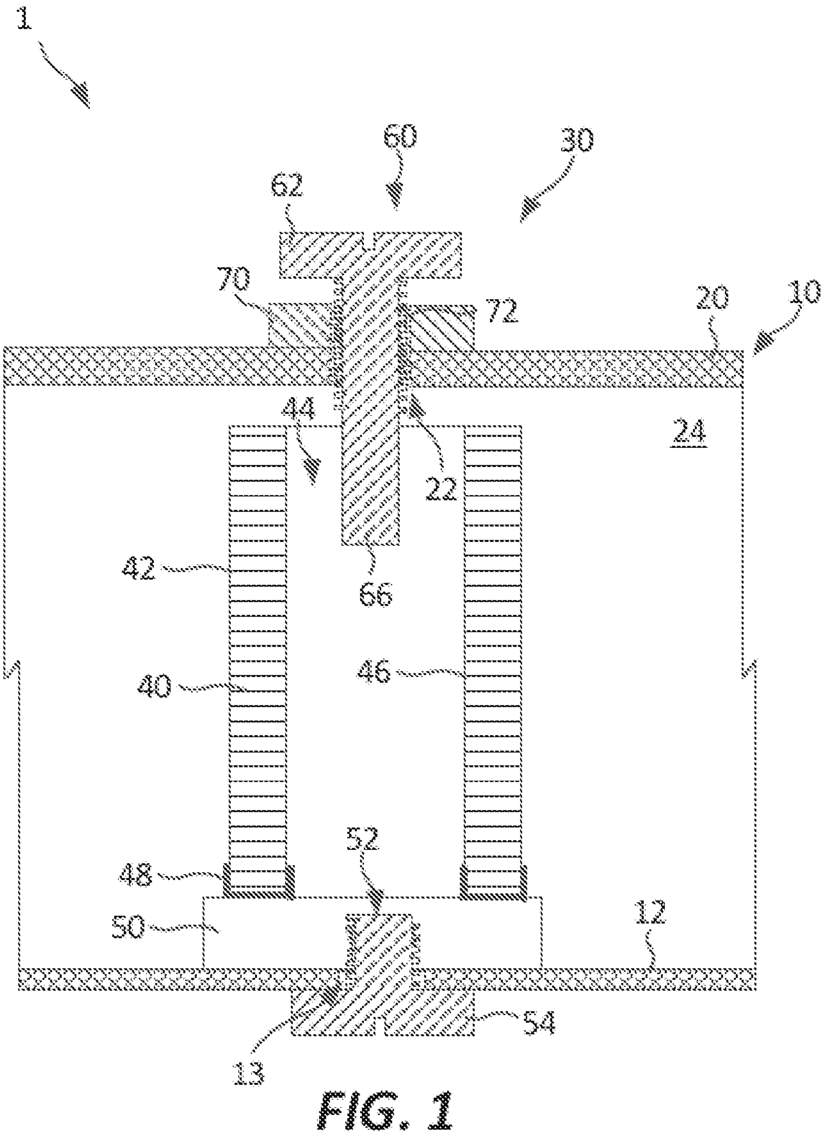
FIG. 1 (Prior Art)
FIG. 1 is a schematic cross-sectional view showing how a dielectric resonator is typically mounted in a resonant cavity filter.

FIG. 1 is a schematic cross-sectional view illustrating a dielectric resonator assembly 30 of a conventional resonant cavity filter 1 and how such a conventionally mounted dielectric resonator assembly 30 may be a potential source of PIM distortion.

As shown in FIG. 1, the resonant cavity filter 1 includes a conductive housing 10 that has a floor 12, sidewalls, and a separate lid 20 that together define an interior cavity 24. A dielectric resonator assembly 30 is mounted within and on the conductive housing 10. The dielectric resonator assembly 30 includes a dielectric resonator 40, a pedestal 50 and a tuning element assembly 60. A plurality of dielectric resonator assemblies are typically included in a resonant cavity filter, and it will be appreciated that FIG. 1 (as well as the other cross-sectional views herein) only shows a small portion of the resonant cavity filter 1 around the dielectric resonator assembly 30.

The dielectric $TM_{01}$ mode resonator 40 comprises a hollow cylinder having an outer sidewall 42 and an axial bore 44 that defines an inner sidewall 46. The hollow cylinder may be formed from a dielectric powder. The bottom of the dielectric resonator 40 is plated with a metal 48 such as, for example, a silver-tin mixture (e.g., a silver layer with tin paste). The pedestal 50 comprises a metal pedestal, and may be formed of, for example, brass, stainless steel, or aluminum. The pedestal may alternatively comprise a dielectric pedestal that has a very high conductivity metal formed on an outer surface thereof.

The pedestal 50 is mounted on the floor 12 of the housing 10. The pedestal 50 has a threaded internal bore 52 that extends from the bottom of the pedestal 50 and mostly, but not completely, through the pedestal 50 (in other cases, not shown, the threaded internal bore 52 may extend completely through the pedestal 50). The floor 12 includes an opening 13 that is axially aligned with the threaded internal bore 52 of the pedestal 50. A metal screw 54 is inserted into the hole 13 and threadably-mated with the threaded internal bore 52 in order to fixedly mount the pedestal 50 on the floor 12. The metal pedestal 50 may be mounted to the floor 12 in other ways such as, for example, by soldering the metal pedestal 50 to the floor 12 or by attaching the pedestal 50 to the floor 12 using an adhesive. The bottom surface of the dielectric resonator 40 is plated with metal such as, for example, a silver-tin mixture (e.g., a silver layer with tin paste), and the dielectric resonator 40 is then soldered in place onto the top surface of the metal pedestal 50.

The dielectric resonator 40 is mounted to extend upwardly from the upper surface of the pedestal 50. A solder joint is formed that fixedly attaches the metal-plated bottom surface of the dielectric resonator 40 to the metal upper surface of the pedestal 50, thereby physically and electrically connecting the dielectric resonator 40 to the pedestal 50.

The lid 20 includes a threaded opening 22 that is aligned above the axial bore 44 of the dielectric resonator 40. A tuning element assembly 60 that includes a tuning screw 62 and a nut 70 is mounted on the lid 20 about the opening 22. The tuning element 62, which may comprise, for example, a bolt or a screw, is threadably-mated with the threaded opening 22 so that a shaft 66 of the tuning element 62 extends into the axial bore 24. The depth to which the tuning element 62 extends into the axial bore 24 may be adjusted by rotating the tuning element 62 in order to tune a frequency response of the dielectric resonator 40. A nut 70, which has internal threads 72, is also threadably-mated with the tuning screw 62 and is used to tighten the tuning element 62 once it is inserted to a desired depth within the cavity 24.

The above-described conventional dielectric resonator assembly 30 has a number of disadvantages. First, as noted above, the solder joint connecting the metal-plated end of the dielectric resonator 40 to the metal pedestal 50 may have inconsistent metal-to-metal connections that may give rise to PIM distortion. Second, the contact between the bottom of the metal pedestal 50 and the floor 12 of the conductive housing 10 is another potential source of PIM distortion. Third, the metal pedestals 50 comprise extra parts that increase material costs. Fourth, soldering each individual dielectric resonator 40 to a corresponding metal pedestal 50 is a time-consuming, labor intensive operation. Fifth, metal plating each dielectric resonator 40 also increases both material costs and manufacturing costs. Sixth, the pedestal-mounted dielectric resonators 40 may exhibit increased losses and/or may exhibit decreased Qu-factor values (and hence increased insertion loss).

Pursuant to embodiments of the present invention, resonant cavity filters are provided that include dielectric resonator assemblies that are directly mounted to an interior surface of the filter housing (e.g., the floor) using threaded dielectric fasteners such as screws, bolts and/or nuts. By using threaded fasteners to attach the dielectric resonators to the housing, the soldered connections used in conventional resonant cavity filters may be eliminated. As such, the lower surface of the dielectric resonators no longer needs to be metal-plated, and the metal pedestals may be omitted. Thus, the PIM distortion performance of the filter may be improved, and the manufacturing costs can be reduced. Additionally, by mounting the dielectric resonators directly to the floor, Qu-factor of the filter can be increased, resulting in a reduction in the insertion loss of the filter.

The resonant cavity filters according to some embodiments of the present invention include a conductive housing having a floor. A dielectric resonator is mounted to extend upwardly from the floor, the dielectric resonator comprising a cylindrical body with a longitudinal bore that defines an inner sidewall. The longitudinal bore has a variable transverse cross-sectional area. A threaded dielectric fastener (e.g., a bolt, screw or nut) is at least partially inserted within the longitudinal bore of the cylindrical body. The dielectric resonator may have a protrusion that extends inwardly from the inner sidewall. The protrusion may have an internal bore, and the threaded dielectric fastener may extend through the internal bore of the protrusion to capture the protrusion between two surfaces in order to mount the dielectric resonator directly to the floor of the housing. In some embodiments, the threaded dielectric fastener may be threadably-mated with a nut, a threaded opening in the floor of the housing, or with a threaded upwardly extending post that is integral with the floor.

The resonant cavity filters according to further embodiments of the present invention include a conductive housing having a floor, at least one sidewall, and a lid that define a cavity. A threaded fastener extends upwardly from the floor into the cavity, where the threaded fastener and the floor comprise a monolithic structure. A dielectric resonator is mounted to extend upwardly from the floor via the threaded fastener. In some embodiments, the threaded fastener comprises an externally-threaded fastener, and an internally-threaded dielectric fastener is threadably-mated with the externally-threaded fastener in order to capture a protrusion on the dielectric resonator therebetween to mount the dielectric resonator to extend upwardly from the floor. In other embodiments, the threaded fastener comprises an internally-threaded fastener, and an externally-threaded dielectric fastener that is threadably-mated with the internally-threaded fastener in order to capture a protrusion on the dielectric resonator therebetween to mount the dielectric resonator to extend upwardly from the floor. In still other embodiments, the dielectric resonator may comprise a cylindrical body with a longitudinal bore that has a tapered sidewall, and an externally-threaded dielectric fastener may be configured to engage the tapered sidewall in order to mount the dielectric resonator to extend upwardly from the floor.

Pursuant to further embodiments of the present invention, resonant cavity filters are provided that include a conductive housing having a floor, at least one sidewall and a lid, and a dielectric resonator mounted to extend upwardly from the floor via a threaded dielectric fastener, the dielectric resonator directly contacting the floor.

In some embodiments, the filters may comprise two port devices such as low-pass, high-pass, band-stop and band-pass filters. In other embodiments, the filters may comprise three port devices such as RF duplexers or diplexers. In still other embodiments, the filters may include additional ports to implement multiplexers, triplexers, combiners or the like. The filters according to embodiments of the present invention may exhibit low insertion loss values, high Qu-factors and/or low levels of PIM distortion.

Embodiments of the present invention will now be described in greater detail with reference to FIGS. 2, 3A-3H, 4A-4D, 5A-5D, 6A-6C, 7A, 7B and 8, in which example embodiments are depicted.

Figure 2:
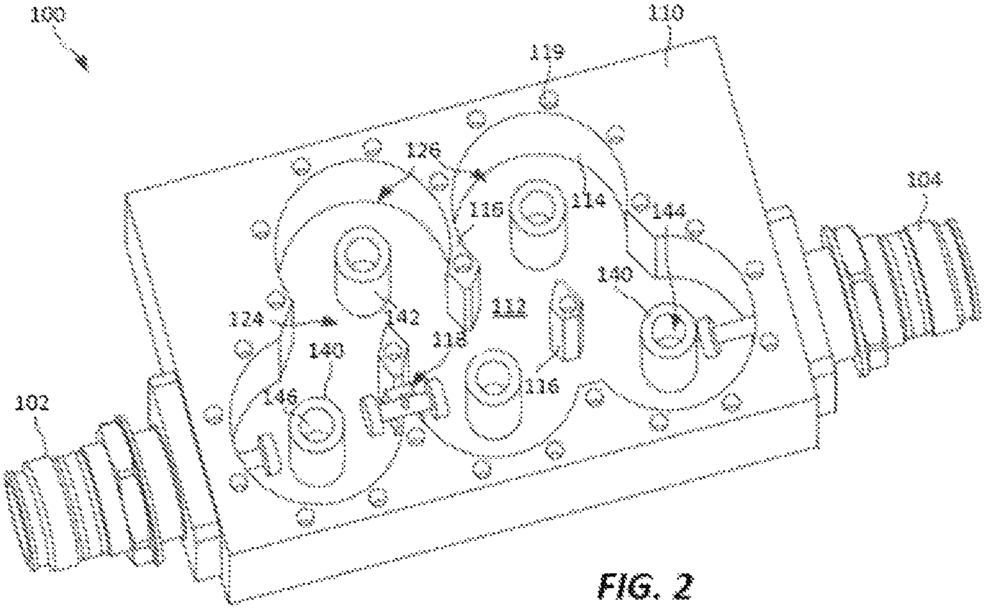
FIG. 2 is a schematic isometric view of a resonant cavity filter that may be implemented using any of the dielectric resonator assemblies according to embodiments of the present invention that are disclosed herein.

FIG. 2 is an isometric view of a resonant cavity filter 100 that may be implemented using any of the dielectric resonator assemblies according to embodiments of the present invention that are disclosed herein. The filter 100 may have a dominant $TM_{01}$ mode. As shown in FIG. 2, the filter 100 may include a conductive housing 110 and a separate lid 120 (see, e.g., FIGS. 3A-3H) that together define an interior cavity 124. The filter 100 further includes a plurality of dielectric resonator assemblies 130A, 130B, 130C (see, e.g., FIGS. 3A-3H). The filter 100 also includes connectors (or other ports) 102, 104 that function as ports for passing RF signals between the filter 100 and external elements (not shown). An RF signal that is received at one of the connectors 102, 104 may have unwanted frequency components. The filter 100 may reduce the power of the unwanted frequency components and pass the filtered signal to the other of the connectors 102, 104.

The conductive housing 110 may comprise, for example, a metal housing or a metal-plated dielectric housing. In some embodiments, the conductive housing 110 may be formed from a solid piece of metal that has a different metal such as silver (Ag), copper (Cu), gold (Au), or tin (Sn) coated thereon. A wide variety of other high conductivity metals can be used. The conductive housing 110 may have a floor 112 and at least one sidewall 114. The resonant cavity filter 100 further includes internal walls 116 that divide the cavity 124 into a plurality of resonant cavities 126. The internal walls 116 may extend upwardly from the floor 112. Coupling windows 118 are also formed in some of the internal walls 116 so that RF signals can pass between selected of the resonant cavities 126. Threaded holes 119 are formed in the upper surface of the conductive housing 110 that receive fasteners that are used to mount the lid 120 on the conductive housing 110. In some embodiments, the conductive housing 110 may be formed by die casting or machining so that the floor 112, sidewalls 114 and internal walls 116 are formed as a single monolithic structure.

Each dielectric resonator assembly 130 includes a dielectric resonator 140. The dielectric resonators 140 may be formed from dielectric powder having a very low dissipation factor in order to reduce insertion losses. In some embodiments, each dielectric resonator 140 may have a cylindrical body that has a circular outer sidewall 142. Each dielectric resonator 140 may be a piece of non-conductive material, typically ceramic, that functions as a resonator for radio waves. A longitudinal bore 144 may be formed through the cylindrical body so that each dielectric resonator 140 also has a circular inner sidewall 146. Each dielectric resonator 140 is mounted to extend upwardly from the floor 112 of the housing 110.

FIG. 2 illustrates the filter 100 with the lid 120 (FIG. 3A) removed to show the cavity 124 and the components (e.g., internal walls 116, dielectric resonators 140, etc.) within the cavity 124. The lid 120 may mount to the conductive housing 110 to enclose the cavity 124. The lid 120 may be fabricated from metal, metal-coated plastic, or any other metal-coated material and may comprise a planar sheet in some embodiments. The lid 120 may include holes that correspond to the threaded holes 119 in the conductive housing 110 to facilitate mounting the lid 120 to the conductive housing 110. Screws or bolts may be inserted through these holes in the lid 120 and into the threaded holes 119 in the conductive housing 110 to secure the lid 120 to the conductive housing 110.

When the filter 100 receives an RF signal through one of the connectors 102, 104, at least a portion of the RF signal may propagate through the cavity 124 and be output through the other of the connectors 102, 104. The filter 100 may also reflect a portion of received signal such that the filter 100 outputs a portion of the received RF signal through the same connector 102, 104 at which the RF signal was input.

The lid 120 may have additional threaded holes formed therethrough that are axially aligned with the longitudinal bores 144 of the respective dielectric resonators 140. Respective tuning elements are threadably-mated with these threaded holes to allow the tuning elements to be inserted through the lid 120 into the longitudinal bores 144 of respective dielectric resonators 140. Each tuning element 162 may be a screw/bolt that changes the resonant frequency of the dominant mode for the dielectric resonator 140 within the filter 100, where the resonant frequency of the dominant mode is based on the distance that the tuning element 162 extends into the dielectric resonator 140.

Figure 3A:
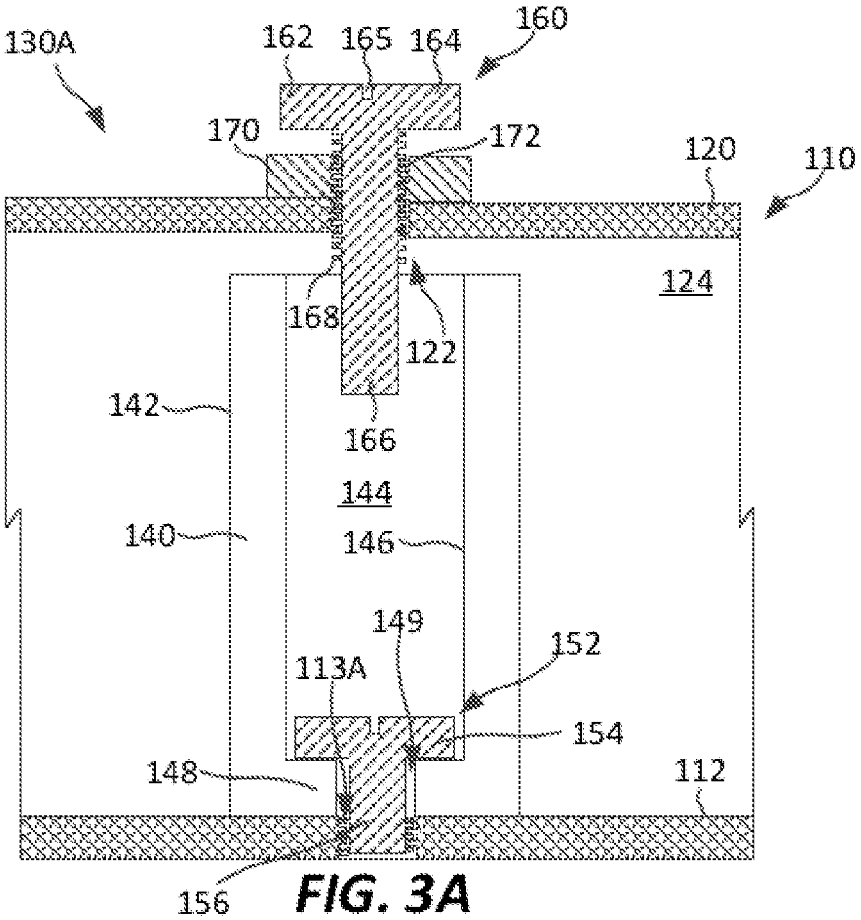
FIGS. 3A-3H are schematic cross-sectional views illustrating dielectric resonator assemblies according to certain embodiments of the present invention.

FIG. 3A is a schematic cross-sectional diagram of a dielectric resonator assembly 130A according to certain embodiments of the present invention. In FIG. 3A (as well as in subsequent figures illustrating dielectric resonator assemblies according to further embodiments of the present invention), the dielectric resonator assembly 130A is shown installed in the resonant cavity filter 100 (FIG. 2) in order to provide context. It will be appreciated that the figures only show a small cross-section of the resonant cavity filter 100.

As shown in FIG. 3A, the dielectric resonator assembly 130A includes a dielectric resonator 140 that is mounted directly to a floor 112 of the conductive housing 110 of the filter 100 by a dielectric fastener 152. The dielectric resonator 140 extends upwardly from the floor 112. The dielectric resonator 140 may be fabricated from a dielectric material, such as a dielectric (e.g., ceramic) powder, and may comprise a cylindrical body having an outer sidewall 142. A longitudinal bore 144 extends through the cylindrical body such that the dielectric resonator 140 is a hollow cylinder that also has an interior sidewall 146 that is defined by the longitudinal bore 144. The shape of the dielectric resonator, in combination with any metal pieces inside the longitudinal bore 144 of the dielectric resonator 140, may significantly influence the amount of separation between the frequency of the dominant mode of the dielectric resonator 140 and the frequency of other higher modes of the dielectric resonator 140. It should be noted that while not shown in the figures, the upper portion of the dielectric resonator 140 may have a "mushroom head" that has a larger surface area in order to decrease the frequency of the dominant eigenmode and one or more higher modes of the dielectric resonator 140. The inclusion of the mushroom head may increase the frequency separation between the dominant eigenmode and one or more higher modes. It will be appreciated that while not shown in the figures, any of the dielectric resonator assemblies according to embodiments of the present invention disclosed herein may include such an enlarged head/upper portion.

The dielectric resonator 140 may be fixedly attached to the floor 112. Mounting the dielectric resonator 140 directly to the floor 112 without an interceding pedestal may significantly reduce insertion losses and significantly increase a Qu-factor for the dielectric resonator 140. The amount of improvement will depend on the height and conductivity of the metal pedestal (that is now omitted), since larger pedestal heights and lower conductivity pedestals have lower Qu-factors. Also, using the dielectric fastener 152 to mount the dielectric resonator 140, as compared to solder, may reduce PIM distortion.

The cylindrical body of the dielectric resonator 140 includes a protrusion 148 that extends inwardly from the inner sidewall 146. The protrusion 148 may be located at the lower end of the cylindrical body of the dielectric resonator 140. In the depicted embodiment, the protrusion 148 comprises an internally-projecting ridge that has an internal bore 149 therethrough. The internal bore 149 of the protrusion 148 comprises a portion of the longitudinal bore 144 of the dielectric resonator 140. Because of the protrusion 148, the longitudinal bore 144 has a variable transverse cross-sectional shape and area, namely a first transverse cross-sectional shape and a first cross-sectional area for the portion of the longitudinal bore 144 that is above the protrusion 148, and a second transverse cross-sectional shape and a second cross-sectional area for the portion of the longitudinal bore 144 that extends through the protrusion 148. The second transverse cross-sectional area is the transverse cross-sectional area of the internal bore 149 of the protrusion 148. The second transverse cross-sectional area is smaller than the first transverse cross-sectional area, as shown. Herein, references to the "transverse" cross-sectional shape and area of a bore refer to the shape and area of the bore, respectively, in a plane that is perpendicular to the longitudinal axis of the bore.

As is further shown in FIG. 3A, the threaded dielectric fastener 152 is at least partially inserted within the longitudinal bore 144 of the cylindrical body of the dielectric resonator 140. In the embodiment of FIG. 3A, the threaded dielectric fastener 152 is a bolt that has a head 154 and an externally-threaded shaft 156 that extends downwardly from the head 154. The shaft 156 of the threaded dielectric fastener 152 extends through the internal bore 149 of the protrusion 148. The floor 112 of the conductive housing 110 includes a threaded opening 113A that is axially aligned with the longitudinal bore 144. The threaded dielectric fastener 152 is threadably-mated with the threaded opening 113A such that the protrusion 148 is captured between the head 154 of the threaded dielectric fastener 152 and the floor 112 of the conductive housing 110. The threaded dielectric fastener 152 is preferably formed of a material having a low dissipation factor in order to minimize the impact that the threaded dielectric fastener 152 may have on the Qu-factor of dielectric resonator assembly 130A.

The dielectric resonator assembly 130A also includes a tuning element assembly 160. The tuning element assembly 160 includes an adjustable tuning element 162 and a nut 170 which has internal threads 172. The lid 120 includes a threaded opening 122 (or a threaded bushing that is formed within the lid 120). The internally-threaded nut 170 is disposed above the threaded opening 122. The threaded opening 122 vertically overlaps the longitudinal bore 144 of the dielectric resonator 140. Herein, two elements are considered to “vertically overlap” if an axis that is perpendicular to the floor 112 extends through both elements. When the dielectric resonator 140 is mounted within the cavity 124, the adjustable tuning element 162 may be threadably-mated with the threaded opening 122 so that the tuning element 162 may be raised and lowered to extend different distances (or not at all) into the longitudinal bore 144 of the dielectric resonator 140 by rotating the tuning element 162. The adjustable tuning element 162 may be inserted into the longitudinal bore 144 to a desired depth to tune the resonant frequency of the $TM_{01}$ dominant mode to a desired frequency. The internally-threaded nut 170 is also threadably-mated with the tuning element 162 and acts as a contra-nut that can be used to fix the tuning element 162 in place once the tuning element 162 is at a desired depth within the cavity 124. The adjustable tuning element 162 may comprise, for example, a threaded fastener such as a screw or a bolt that may be fabricated from a metal material (such as stainless steel) or a dielectric material that is plated with a metal such as Ag, Cu, Au, or Sn (or other high conductivity metal). While the tuning element 162 is illustrated as a tuning screw having a head, it will be appreciated that other tuning elements may be used such as, for example, tuning elements that do not have a head, tuning screws that have a partially threaded rod and a smooth surface below the threads or specialized tuning screws that may be automatically fixed during tuning.

In some embodiments, each tuning element 162 may include a head 164 and a tubular shaft 166 having external threads 168 that is disposed below the head 164. The head 164 may include one or more slots, openings, protrusions or other mating structures that are designed to cooperate with a tool for purposes of rotating the tuning element 160. In some embodiments, the head 164 may include a female mating structure 165 such as a slot that is configured to receive the end of a regular screwdriver, a pair of crossed slots that are configured to receive the end of a Phillips screwdriver, a square or hexagonal aperture that is designed to receive an end of an Allen wrench, a star shaped cavity that is configured to receive an end of a TORX® brand hand operated tool, etc. In other embodiments, the mating structure may comprise a protruding structure such as, for example, a square or hexagonal nut.

The dielectric resonator assembly 130A that is shown in FIG. 3A may be used to implement the dielectric resonators included in the resonant cavity filter 100 of FIG. 2. Notably, the dielectric resonator 140 of dielectric resonator assembly 130A is mounted directly to the floor 112 of the conductive housing 110 without the use of solder. Directly adhering the dielectric resonator 140 to the floor 112 (or other interior surface) of the conductive housing 110 (as compared to mounting the dielectric resonator 140 on a metallic pedestal) may reduce insertion losses and increase the Qu-factor of the dielectric resonator 140. Also, directly adhering the dielectric resonator 140 to the floor 112 may reduce PIM distortion. Further, using plastic and/or dielectric materials may reduce the weight and cost of resultant components.

Figure 3B:
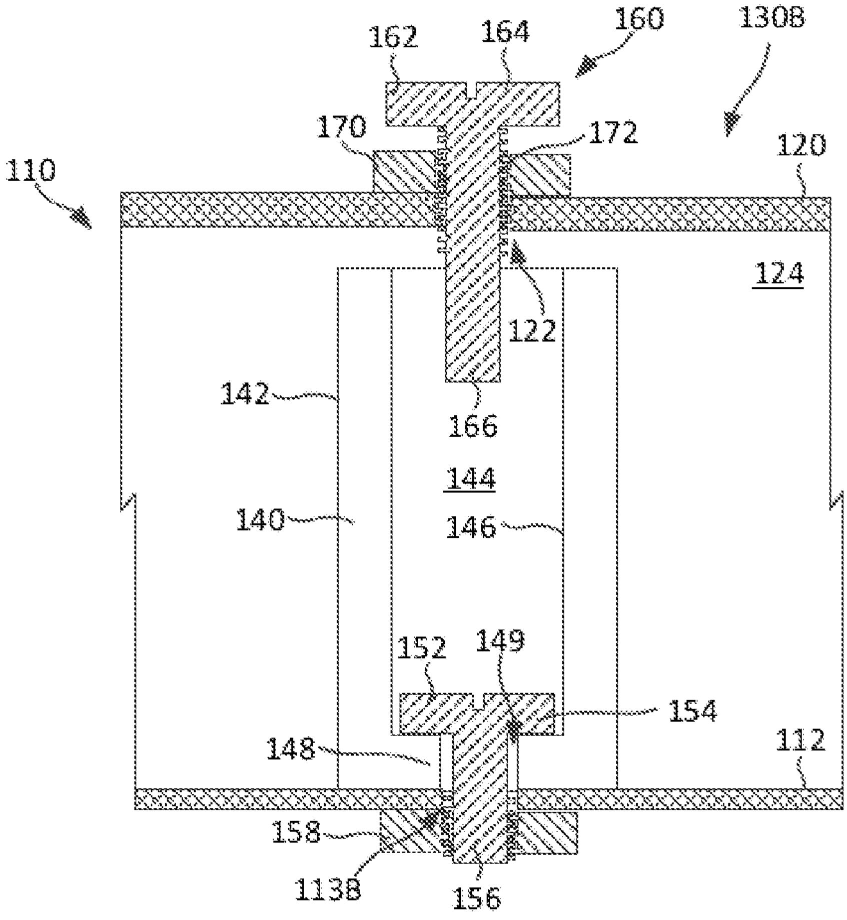

FIG. 3B is a schematic cross-sectional diagram of a dielectric resonator assembly 130B according to further embodiments of the present invention. The dielectric resonator assembly 130B is very similar to the dielectric resonator assembly 130A of FIG. 3A, and hence the discussion below will only focus on the differences between the two dielectric resonator assemblies.

As can be seen by comparing FIGS. 3A and 3B, the dielectric resonator assembly 130B differs from dielectric resonator assembly 130A in that the threaded opening 113A included in the floor 112 is replaced with an unthreaded opening 113B in dielectric resonator assembly 130B that extends all of the way through the floor 112. The threaded shaft 156 of threaded dielectric fastener 152 extends through the opening 113B and is threadably-mated with a nut 158 that is mounted external to the conductive housing 110. The nut 158 may be a dielectric nut in some embodiments to help avoid PIM distortion that otherwise may occur if a metal nut is used that directly contacts the conductive housing 110. In other embodiments, the nut 158 may be a metal nut since the electromagnetic fields outside of the conductive housing 110 tend to be very small so that a metal nut 158 may not raise a significant risk of PIM distortion. If a metal nut 158 is used and there is a risk of PIM distortion, a dielectric washer (not shown) may be interposed between the metal nut 158 and the conductive housing 110. The protrusion 148 of dielectric resonator 140 is captured in between the head 154 of threaded dielectric fastener 152 and the floor 112. The dielectric resonator assembly 130B may allow for the use of a thinner floor 112 than the floor 112 used with dielectric resonator assembly 130A, and also avoids the need to form threaded openings in the floor 112.

Figure 3C:
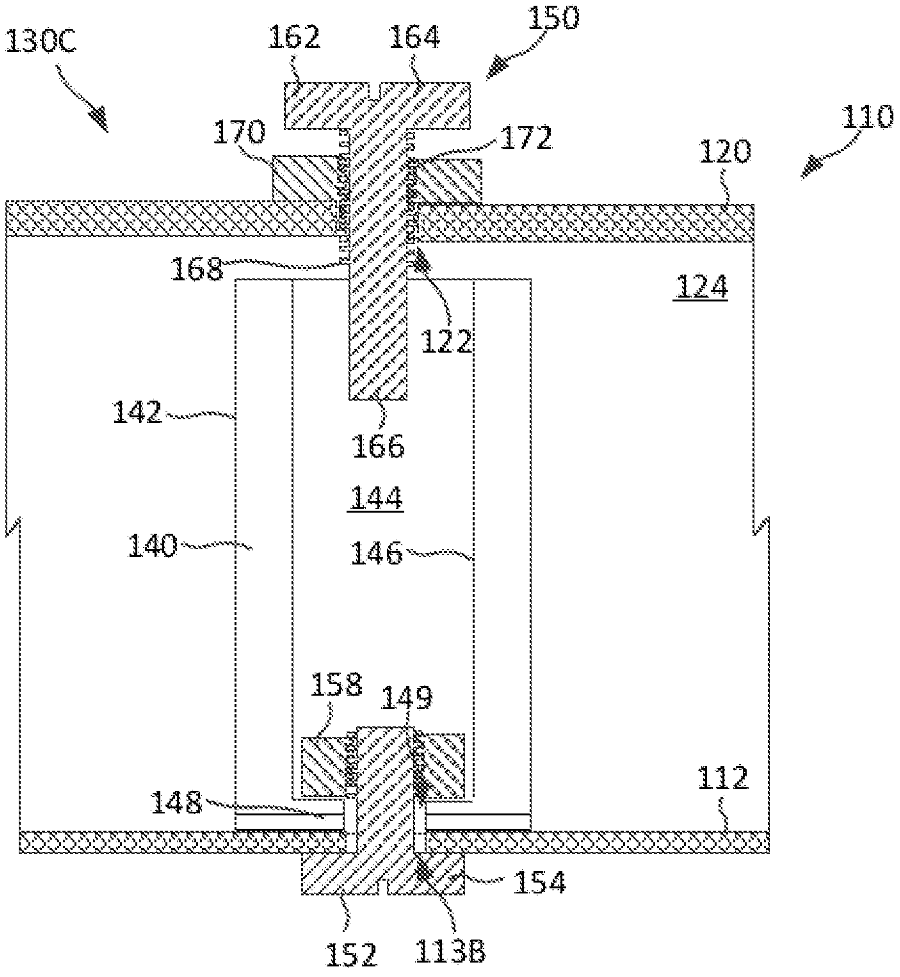

FIG. 3C is a schematic cross-sectional diagram of a dielectric resonator assembly 130C according to still further embodiments of the present invention. The dielectric resonator assembly 130C is very similar to the dielectric resonator assembly 130B of FIG. 3B, and hence the discussion below will only focus on the differences between the two dielectric resonator assemblies.

As can be seen by comparing FIGS. 3B and 3C, the dielectric resonator assembly 130C differs from dielectric resonator assembly 130B in that the positions of the threaded dielectric fastener 152 and the nut 158 are reversed so that the nut 158 is within the longitudinal bore 144 of the dielectric resonator 140 and the head 154 of the threaded dielectric fastener 152 is outside the conductive housing 110. The nut 158 may be a dielectric nut in some embodiments and a metal nut in other embodiments. If a dielectric nut 158 is used, it is preferably formed of a material having a low dissipation factor in order to minimize the impact that it has on the Qu-factor of the resonant cavity filter that includes dielectric resonator assembly 130C.

Figure 3D:
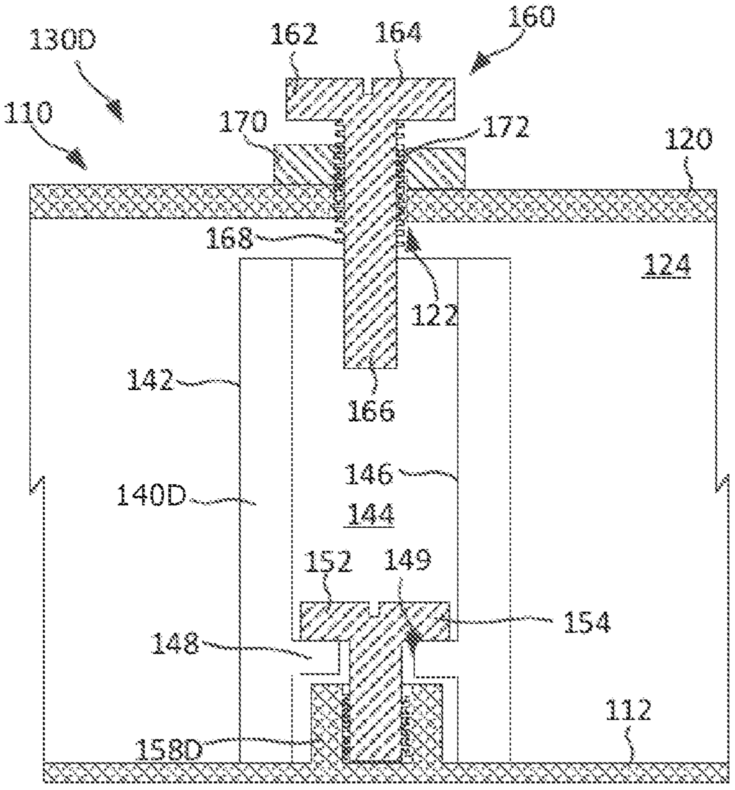

FIG. 3D is a schematic cross-sectional diagram of a dielectric resonator assembly 130D according to further embodiments of the present invention. The dielectric resonator assembly 130D is similar to the dielectric resonator assembly 130A of FIG. 3A, and hence the discussion below will only focus on the differences between the two dielectric resonator assemblies.

As can be seen by comparing FIGS. 3A and 3D, the dielectric resonator assembly 130D differs from dielectric resonator assembly 130A in that the threaded opening 113A included in the floor 112 of the resonant cavity filter is replaced with an upwardly extending, internally-threaded post 158D in dielectric resonator assembly 130D. The upwardly extending, internally-threaded post 158D is integral with the floor 112; for example, both the upwardly extending, internally-threaded post 158D and the floor 112 may be formed as a single monolithic structure by die-casting. The entire conductive housing 110 and the upwardly extending, internally-threaded post 158D may be a single monolithic structure in some embodiments. Additionally, since the internally-threaded post 158D extends upwardly from the floor 112, the dielectric resonator 140 of FIG. 3A is replaced with a dielectric resonator 140D that has a protrusion 148 that is spaced-apart from the bottom of the dielectric resonator 140D. A small air gap (not shown) is typically provided between the bottom surface of the protrusion 148 and the top surface of the internally-threaded post 158D. The threaded dielectric fastener 152 is threadably-mated within the internally-threaded post 158D so that the force exerted by the lower surface of the head 154 of the threaded dielectric fastener 152 on the upper surface of the protrusion 148 acts to fixedly mount the dielectric resonator 140D within the cavity 124.

A significant advantage of the design of dielectric resonator assembly 130D is that the upwardly extending, internally-threaded post 158D may act as an additional tuning element that may increase the frequency separation between the dominant mode and other higher modes. In particular, the upwardly extending, internally-threaded post 158D may shift the resonant frequencies of the higher modes to higher frequencies to increase the frequency separation between the $TM_{01}$ dominant mode and the non-dominant higher modes. Increasing this frequency separation may reduce parasitic effects, such as parasitic internal oscillations at non-dominant modes and in-band distortion by reducing the chances that an in-band signal excites a non-dominant mode.

Figure 3E:
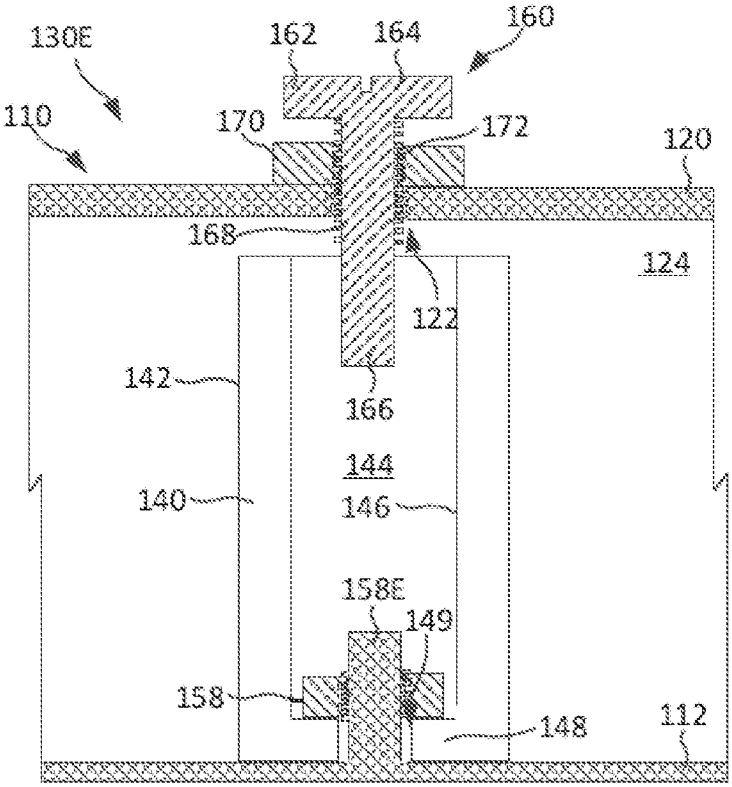

FIG. 3E is a schematic cross-sectional diagram of a portion of a dielectric resonator assembly 130E according to further embodiments of the present invention. The dielectric resonator assembly 130E is similar to the dielectric resonator assembly 130C of FIG. 3C, and hence the discussion below will only focus on the differences between the two dielectric resonator assemblies.

As can be seen by comparing FIGS. 3C and 3E, the dielectric resonator assembly 130E differs from dielectric resonator assembly 130C in that the threaded dielectric fastener 152 used in dielectric resonator assembly 130C is replaced with an externally-threaded, upwardly extending post 158E in dielectric resonator assembly 130E. The externally-threaded post 158E is integral with the floor 112 and can be formed, for example, as a single monolithic structure via die-casting. The externally-threaded post 158E does not contact the cylindrical body of the dielectric resonator 140. A dielectric nut 158 is threadably-mated with the externally-threaded, upwardly extending post 158E inside the longitudinal bore 144 of the dielectric resonator 140. As discussed above with reference to FIG. 3D, the upwardly extending post 158E may act as an additional tuning element that may increase the frequency separation between the dominant mode and other higher modes. A small air gap is provided between the inner wall of the protrusion 148 and the externally-threaded post 158E. The dielectric nut 158 is preferably formed of a material having a low dissipation factor in order to minimize the impact that it has on the Qu-factor of a resonant cavity filter that includes the dielectric resonator assembly 130E.

Figure 3F:
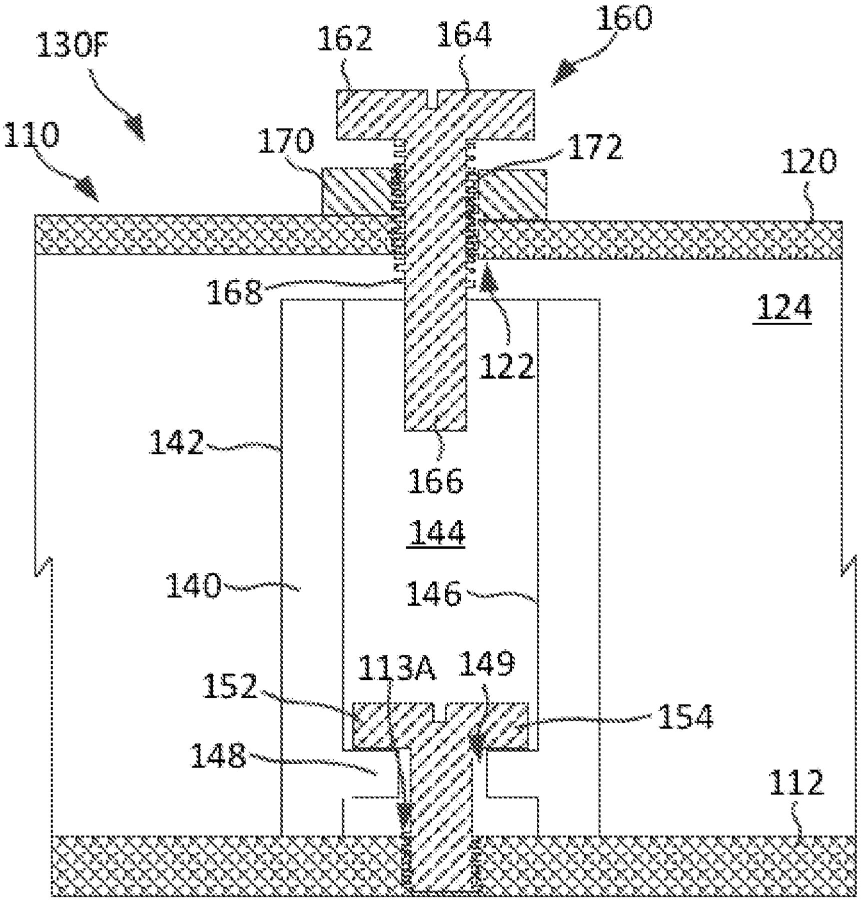

FIG. 3F is a schematic cross-sectional diagram of a dielectric resonator assembly 130F according to still further embodiments of the present invention. The dielectric resonator assembly 130F is very similar to the dielectric resonator assembly 130A of FIG. 3A, and hence the discussion below will only focus on the differences between the two dielectric resonator assemblies.

As can be seen by comparing FIGS. 3A and 3F, the dielectric resonator assembly 130F differs from dielectric resonator assembly 130A in that the dielectric resonator 140 of FIG. 3A is replaced with the dielectric resonator 140D of FIG. 3D in dielectric resonator assembly 130F that includes a protrusion 148 that is spaced-apart from the bottom of the dielectric resonator 140.

Figure 3G:
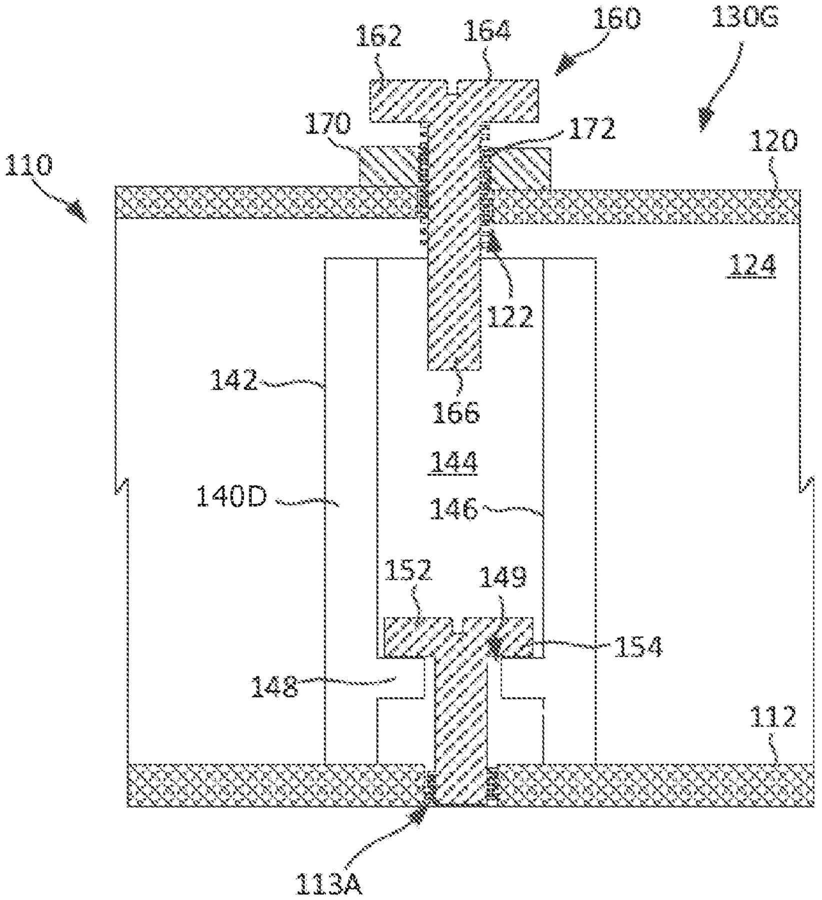

FIG. 3G is a schematic cross-sectional diagram of a dielectric resonator assembly 130G according to still further embodiments of the present invention. The dielectric resonator assembly 130G is very similar to the dielectric resonator assembly 130A of FIG. 3A, with the difference being that the dielectric resonator 140 of FIG. 3A is replaced with the dielectric resonator 140D of the dielectric resonator assembly 130D of FIG. 3D. As all of the elements of dielectric resonator assembly are discussed above with reference to FIGS. 3A and 3D, further discussion thereof will be omitted.

Figure 3H:
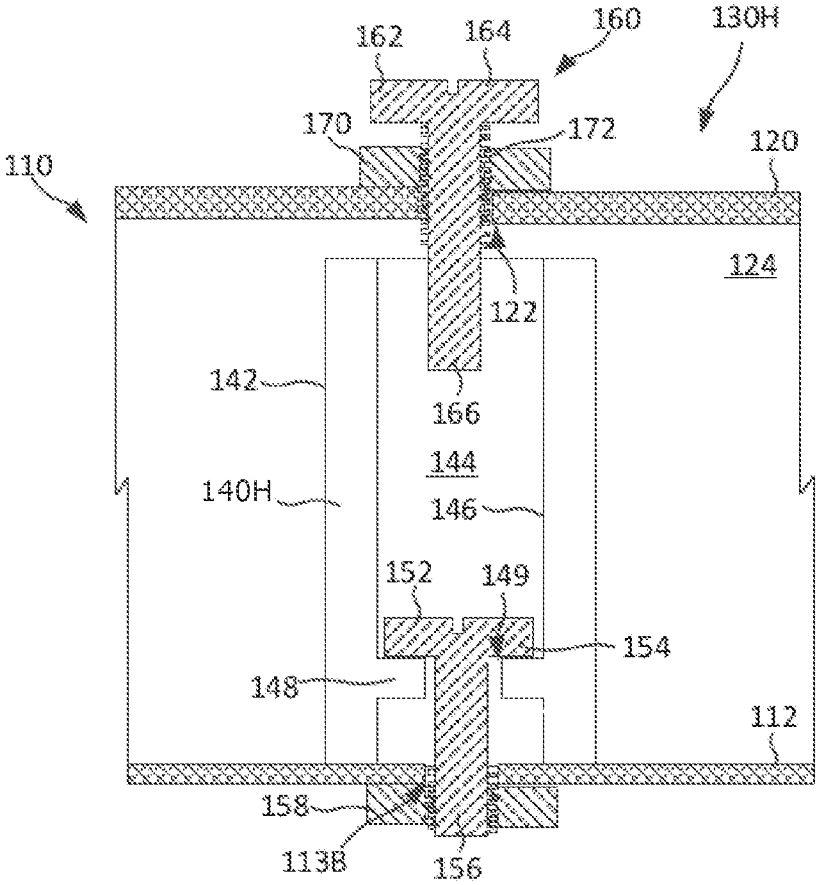

FIG. 3H is a schematic cross-sectional diagram of a dielectric resonator assembly 130H according to still further embodiments of the present invention. The dielectric resonator assembly 130H combines aspects of the dielectric resonator assembly 130B of FIG. 3B and the dielectric resonator assembly 130D of FIG. 3D. In particular, the dielectric resonator assembly 130H is identical to dielectric resonator assembly 130B of FIG. 3B except that the protrusion 148 is spaced-apart from the bottom of the dielectric resonator 140H as is done with the dielectric resonator assembly 130D of FIG. 3D. As all of the elements of dielectric resonator assembly 130H are discussed above with reference to FIGS. 3B and 3D, further discussion thereof will be omitted.

FIGS. 4A-4D are schematic cross-sectional views illustrating dielectric resonator assemblies according to further embodiments of the present invention that use dielectric disks and threaded dielectric fasteners to mount dielectric resonators directly to the floors of the conductive housings of the filters in which they are implemented.

Figure 4A:
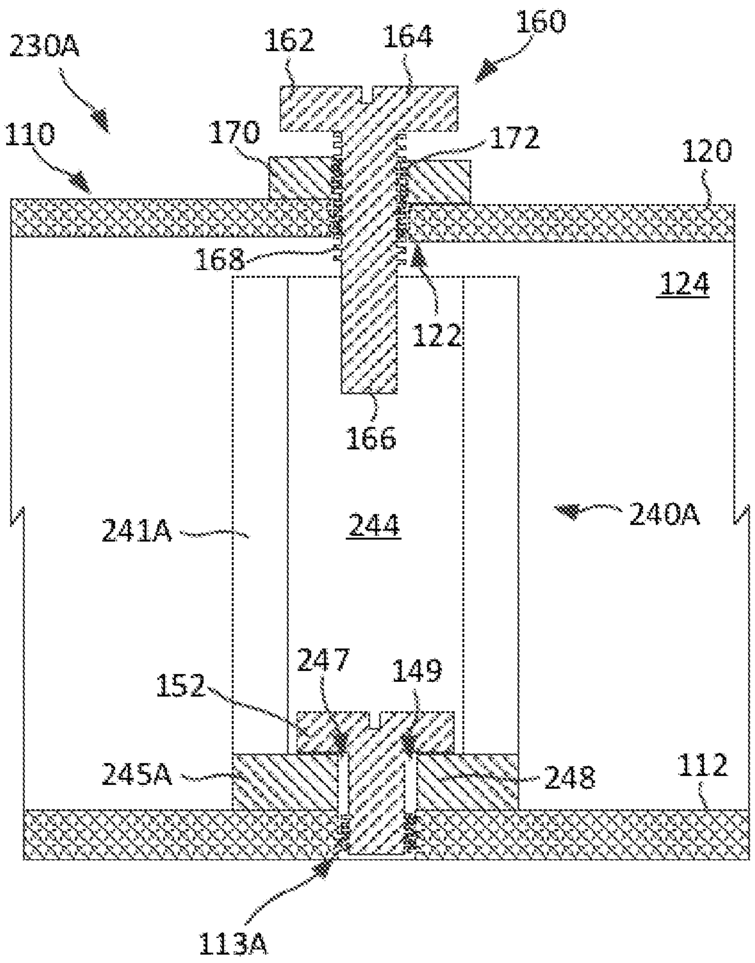
FIGS. 4A-4D are schematic cross-sectional views illustrating dielectric resonator assemblies according to further embodiments of the present invention.

Referring to FIG. 4A, a dielectric resonator assembly 230A is similar to the dielectric resonator assembly 130A of FIG. 3A, except that, in dielectric resonator assembly 230A, the dielectric resonator comprises a two-piece dielectric resonator 240A, whereas dielectric resonator 140 of dielectric resonator assembly 130A may comprise a single monolithic element. In particular, the dielectric resonator 240A comprises a first piece 241A that may be substantially identical to dielectric resonator 140 (albeit, possibly shorter). The dielectric resonator 240A also includes a second piece 245A in the form of an annular dielectric disk. The annular dielectric disk 245A may include an internal bore 247 that may be axially aligned with a longitudinal bore 244 of the first piece 241A of dielectric resonator 240A. The annular dielectric disk 245A may be bonded to the lower surface of the first piece 241A of dielectric resonator 240A via, for example, an adhesive. The inner edge of the annular dielectric disk 245A forms a protrusion 248. The longitudinal bore 244 of the first piece 241A of dielectric resonator 240A has a first transverse cross-sectional area and the longitudinal bore 247 of the second piece 245A of dielectric resonator 240A has a second transverse cross-sectional area that is less than the first transverse cross-sectional area.

The annular dielectric disk 245A may be formed of the same material as the first piece 241A of dielectric resonator 240A or may be formed of a different material. The annular dielectric disk 245A may or may not contribute to the resonant function of the dielectric resonator 240A (whether the annular dielectric disk 245A contributes to the resonant function typically depends on the material of the annular dielectric disk 245A). The annular dielectric disk 245A is considered to be part of the dielectric resonator 240A, even if the annular dielectric disk 245A has little or no contribution to the resonant function of the dielectric resonator 240A. The need to bond (e.g., using an adhesive such as a glue) the two pieces 241A, 245A of the dielectric resonator 240A together requires an additional manufacturing operation, but this design simplifies the manufacture of the first piece 241A of the dielectric resonator 240A since the first piece 241A now has a constant transverse cross-section. The glue or other adhesive may also have a negative effect on the unloaded quality factor of a resonant cavity filter that includes dielectric resonator assembly 230A, and hence a very thin layer of adhesive may be used, and the adhesive may have a very low dissipation factor.

Figure 4B:
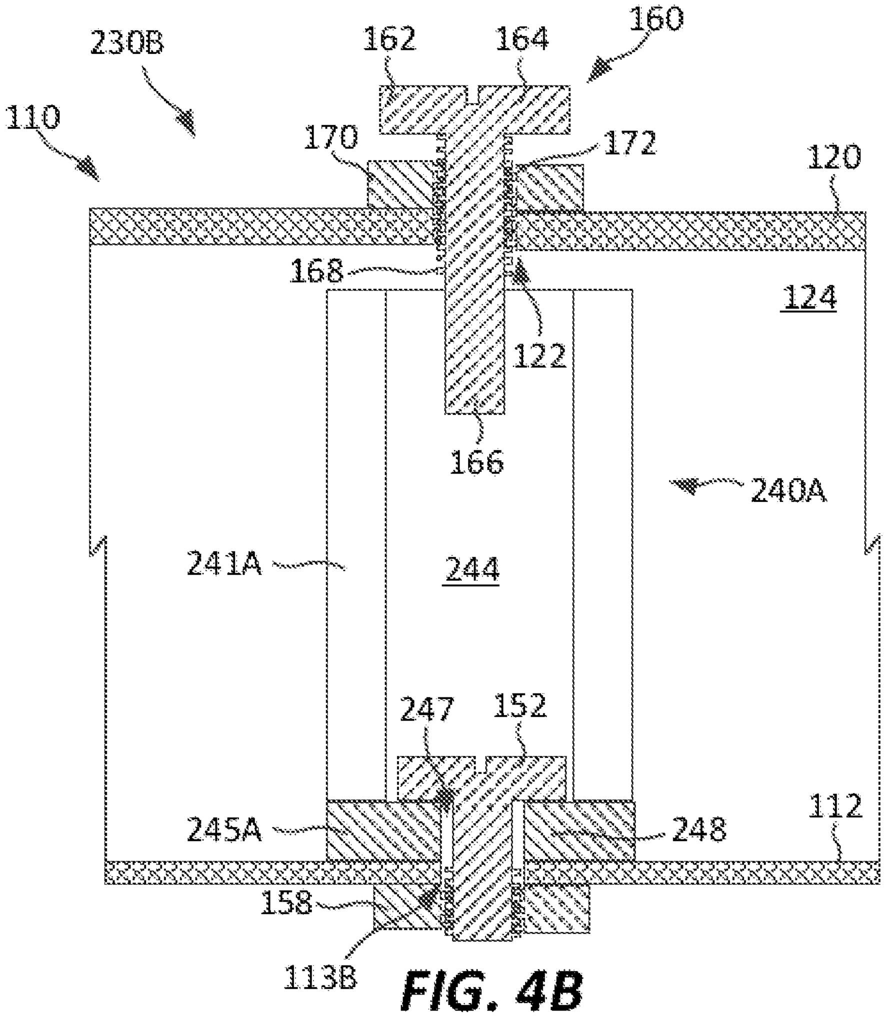

FIG. 4B is a schematic cross-sectional diagram of a dielectric resonator assembly 230B according to further embodiments of the present invention. The dielectric resonator assembly 230B combines aspects of dielectric resonator assembly 130B of FIG. 3B and of dielectric resonator assembly 230A of FIG. 4A. In particular, dielectric resonator assembly 230B is identical to dielectric resonator assembly 130B of FIG. 3B, except that the dielectric resonator assembly 230B includes the two-part dielectric resonator 240A of dielectric resonator assembly 230A instead of the single-piece dielectric resonator 140 of dielectric resonator assembly 130B. It will also be appreciated that in further embodiments the positions of the threaded dielectric fastener 152 and nut 158 may be reversed in the exact same manner shown above with respect to the embodiments of FIGS. 3B and 3C.

Figure 4C:
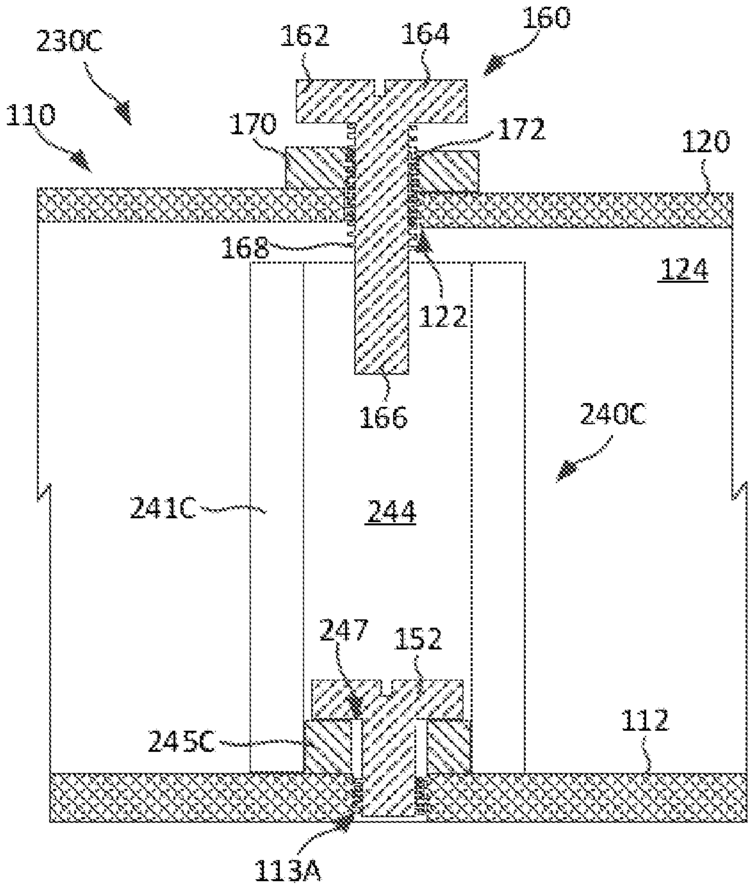

FIG. 4C is a schematic cross-sectional diagram of a portion of a dielectric resonator assembly 230C according to additional embodiments of the present invention. The dielectric resonator assembly 230C is identical to the dielectric resonator assembly 230A of FIG. 4A, except that the dielectric resonator assembly 230C includes a two-piece dielectric resonator 240C. The two-piece dielectric resonator 240C uses a smaller annular dielectric disk 245C that is inserted within the longitudinal bore 244 of the first piece 241C of dielectric resonator 240C. The first piece 241C of dielectric resonator 240C may be identical to the first piece 241A of dielectric resonator 240A, except that the first piece 241C may be longer.

Figure 4D:
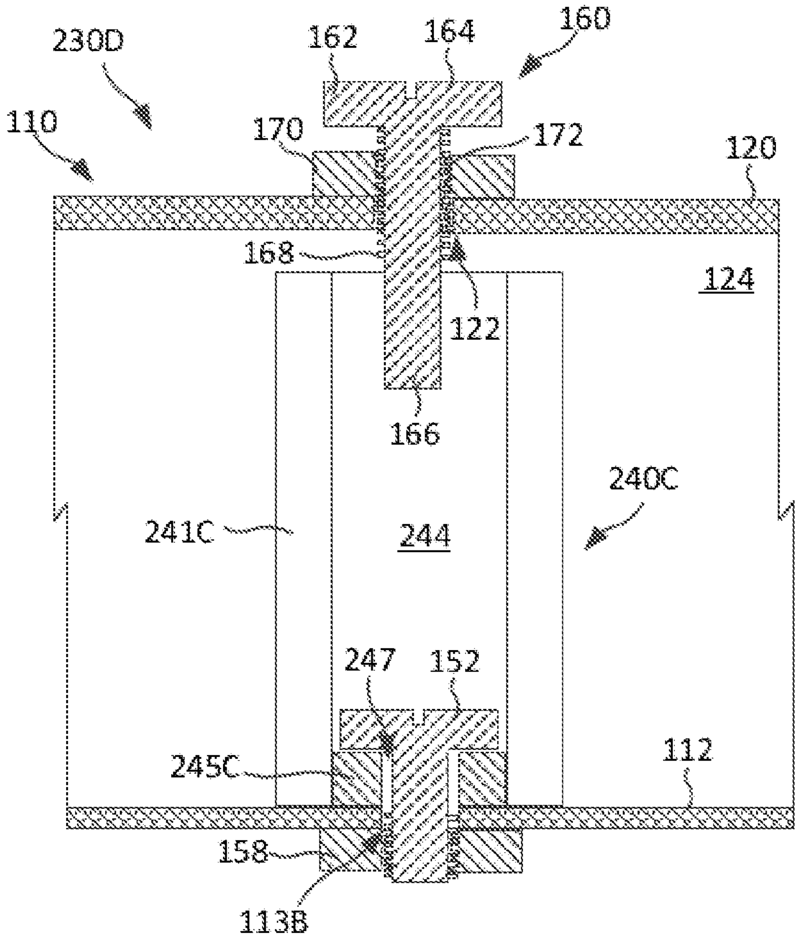

FIG. 4D is a schematic cross-sectional diagram of a dielectric resonator assembly 230D according to additional embodiments of the present invention. The dielectric resonator assembly 230D is identical to the dielectric resonator assembly 230B of FIG. 4B, except that the dielectric resonator assembly 230D includes the two-piece dielectric resonator 240C instead of the two-piece dielectric resonator 240A. Additionally, similar to the case of FIG. 4B above, it will also be appreciated that in further embodiments the positions of the threaded dielectric fastener 152 and nut 158 may be reversed in the exact same manner shown above with respect to the embodiments of FIGS. 3B and 3C.

FIGS. 5A-5D are schematic cross-sectional views illustrating dielectric resonator assemblies according to further embodiments of the present invention that use threaded dielectric fasteners to mount dielectric resonators having tapered axial bores directly to the floors of the conductive housings of the filters. One advantage of using dielectric resonators having tapered axial bores is that the tapered axial bore effects the dominant or "eigenmode" frequency of the dielectric resonator (as well as frequencies of the higher modes), shifting the dominant mode frequency and higher mode frequencies to lower frequencies. This means that the embodiments of FIG. 5A-5D may use smaller dielectric resonators than, for example, the embodiments described above with reference to FIGS. 3A-3H and 4A-4D. Higher Qu-factors and lower insertion losses may be achieved due to the use of the smaller dielectric resonators (along with the material savings and smaller filter size, both of which are also advantageous).

Figure 5A:
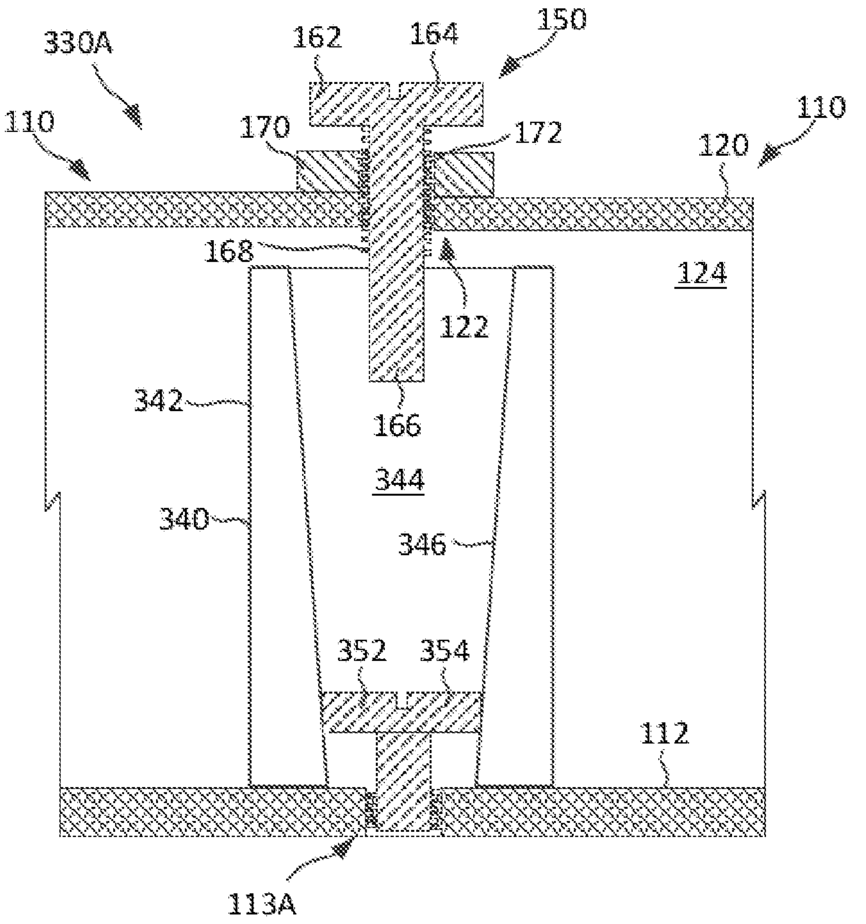
FIGS. 5A-5D are schematic cross-sectional views illustrating dielectric resonator assemblies according to additional embodiments of the present invention.

Referring to FIG. 5A, a dielectric resonator assembly 330A is similar to the dielectric resonator assembly 130A of FIG. 3A, except that dielectric resonator assembly 330A includes (1) a dielectric resonator 340 that has an outer sidewall 342 and a bore 344 having tapered inner sidewalls 346 and (2) a threaded dielectric fastener (bolt) 352 that has a head 354 with tapered sidewalls. Since the inner sidewalls 346 that define the bore 344 and the head 354 of the threaded dielectric fastener 352 are tapered in the same direction, the threaded fastener (bolt) 352 may engage the tapered sidewalls 346 when threaded dielectric fastener (bolt) 352 is threadably-mated with the threaded opening 113A in the floor 112 of the conductive housing 110 in order to firmly affix the dielectric resonator 340 to the floor 112. Thus, the protrusion 148 that is included in dielectric resonator 140 of dielectric resonator assembly 130A may be omitted as the tapered sidewall 346 of longitudinal bore 344 serves the same function as the protrusion 148. Due to the tapered sidewalls 346, dielectric resonator 340 has the longitudinal bore 344 that has a circular transverse cross-section of varying area, with the circular transverse cross-section of varying area increasing with increasing distance from the floor 112 of the conductive housing 110.

Figure 5B:
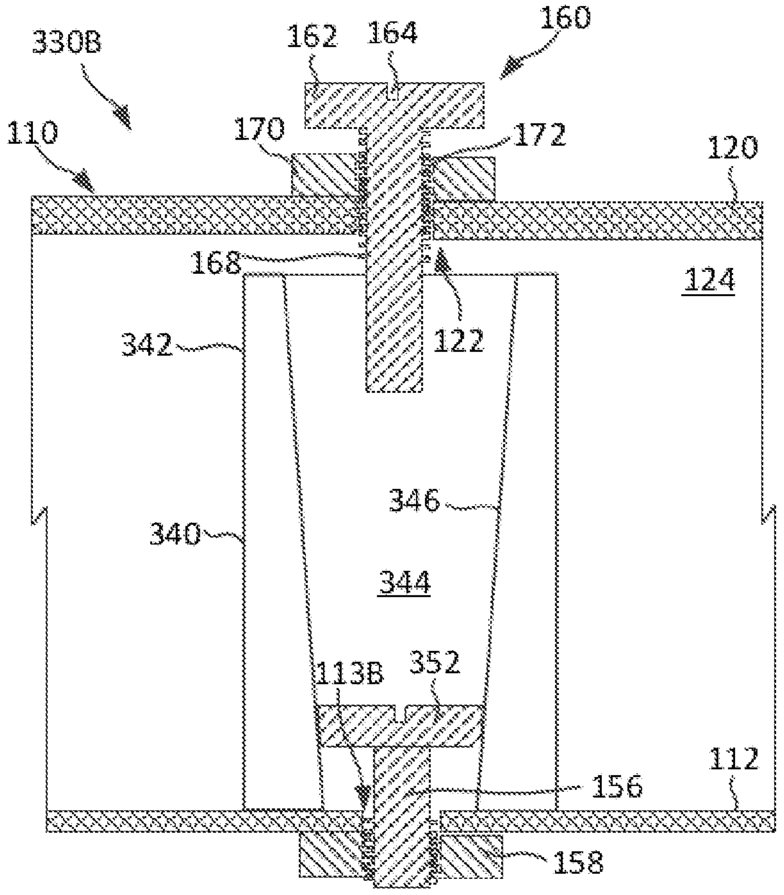

FIG. 5B is a schematic cross-sectional diagram of a dielectric resonator assembly 330B according to further embodiments of the present invention. The dielectric resonator assembly 330B combines aspects of dielectric resonator assembly 130B of FIG. 3B and of dielectric resonator assembly 330A of FIG. 5A. In particular, dielectric resonator assembly 330B is identical to dielectric resonator assembly 330A of FIG. 5A, except that the threaded opening 113A in the floor 112 is replaced with a non-threaded opening 113B, and a nut 158 is added that receives the threaded shaft 156 of threaded dielectric fastener 352.

Figure 5C:
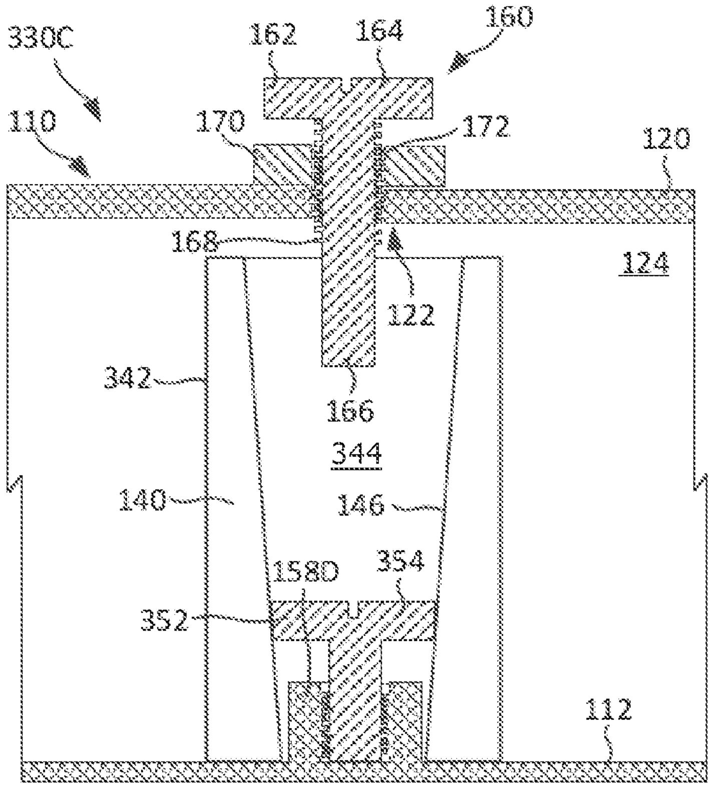

FIG. 5C is a schematic cross-sectional diagram of a dielectric resonator assembly 330C according to further embodiments of the present invention. The dielectric resonator assembly 330C combines aspects of dielectric resonator assembly 130D of FIG. 3D and of dielectric resonator assembly 330A of FIG. 5A. In particular, dielectric resonator assembly 330C is identical to dielectric resonator assembly 330A of FIG. 5A, except that the threaded opening 113A in the floor 112 of the conductive housing 110 that is used in dielectric resonator assembly 330A is replaced in dielectric resonator assembly 330C with the upwardly extending, internally-threaded post 158D of dielectric resonator assembly 130D in dielectric resonator assembly 330C.

Figure 5D:
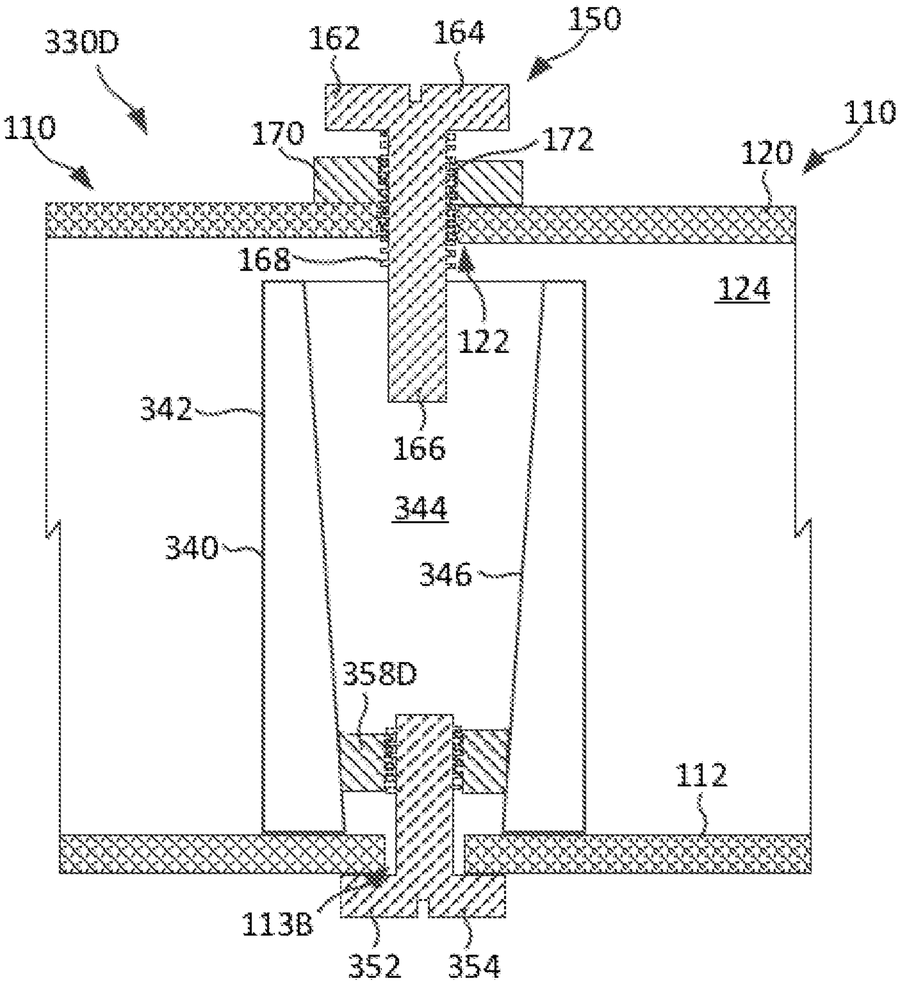

FIG. 5D is a schematic cross-sectional diagram of a dielectric resonator assembly 330D according to further embodiments of the present invention. The dielectric resonator assembly 330D is very similar to the dielectric resonator assembly 330A of FIG. 5A, except that the threaded dielectric fastener 152 of FIG. 3C is used, and the dielectric nut 158 of the embodiment of FIG. 3C is replaced in dielectric resonator assembly 330D with a dielectric nut 358D that has tapered sidewalls that are configured to mate with the tapered inner sidewalls 346 of the bore 344.

Figure 6A:
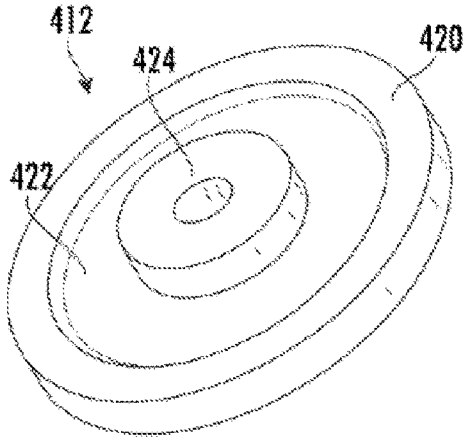
FIG. 6A is an isometric view of a portion of the floor of a resonant cavity filter according to further embodiments of the present invention during an intermediate step in the manufacturing process thereof
Figure 6B:
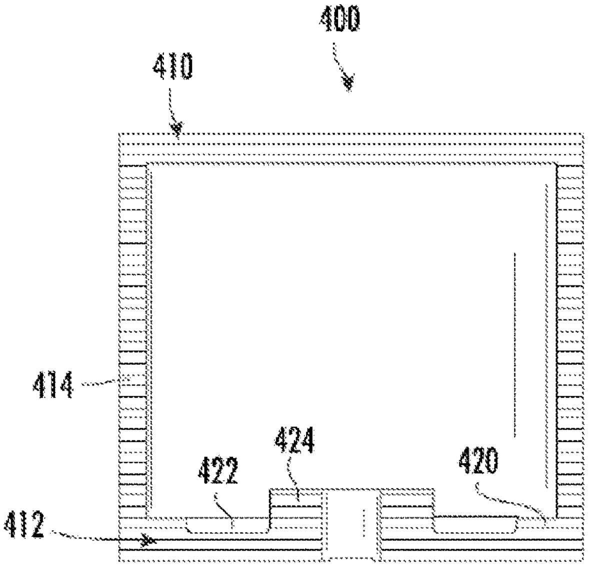
FIGS. 6B and 6C are schematic cross-sectional views of a portion of the resonant cavity filter of FIG. 6A illustrating how a pit may be formed in the floor that surrounds the location of a dielectric resonator, and how the floor directly underneath the dielectric resonator mounting location may then be milled down to be coplanar with a main surface of the floor to provide a very flat mounting surface for the dielectric resonator.
Figure 6C:
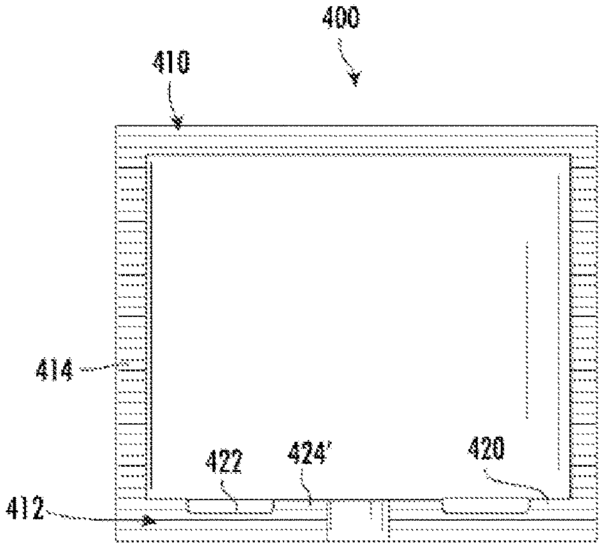

FIG. 6A is an isometric view of a portion of the floor of a resonant cavity filter 400 (FIGS. 6B and 6C) according to further embodiments of the present invention during an intermediate step in the manufacturing process thereof. FIGS. 6B and 6C are schematic cross-sectional views of a resonant cavity filter 400 illustrating how a raised region of the floor shown in FIG. 6A that is underneath one of the dielectric resonators may be milled to provide a very flat mounting surface for the dielectric resonator.

As shown in FIG. 6A, the conductive housing 410 (FIGS. 6B and 6C) may be die cast so that the raised portion 424 of the floor 412 that will be directly underneath a dielectric resonator is higher than other portions 420, 422 of the floor 412. A milling operation may then be performed to grind away the raised portion 424 of the floor 412.

Referring to FIG. 6B, the resonant cavity filter 400 includes a conductive housing 410 that has a floor 412 and sidewalls 414. The conductive housing 410 may comprise a monolithic structure that may be formed via die casting or computer-aided machining. The portion of the floor that is in the vicinity of each dielectric resonator (see FIG. 6B) may comprise a recessed region 422 that surrounds the location where the dielectric resonator is to be mounted and a raised portion 424 that is surrounded by the recessed region 422. Each raised portion 424 may comprise a raised island that extends farther upwardly than the surrounding recessed region 422.

Die casting operations have certain limitations, and hence it may be difficult to die cast the floor 412 to be very flat underneath each dielectric resonator included in resonant cavity filter 400. In order to address this issue, the floor 412 may be die cast to have regions with three different heights, namely a first main region 420 that forms a reference plane for the floor 412, a second recessed region 422 which may have a slightly lower top surface (e.g., 0.1-0.4 mm lower) than the first main region 420, and a third raised portion 424. Referring to FIGS. 6B and 6C, a planarizing process (e.g., a milling process) may be performed in order to grind away the top surface of each raised portion 424. FIG. 6B illustrates the raised portion island 424 prior to milling, while FIG. 6C shows how the raised portion 424 is removed by the milling process to form a region 424' in the floor 412. The milling process may lower the upper surface of each raised portion 424 to be level with the upper surface of the first main region 420. The planarizing process may ensure that the regions 424' of the floor 412 underneath the dielectric resonators may be very flat, in order to achieve a maximally-smooth contact-seating area between the floor and the bottom surface of the dielectric resonator. This approach may increase the unloaded Qu-factor of each dielectric resonator as compared to dielectric resonators mounted on die-cast floors (which may not be as flat). The recessed region 422 that surrounds the raised portion 424 may be provided so that the milling tool does not damage the floor 412 during the milling process. This layout can improve the Qu-factor in comparison with filters having a raised pedestal such as shown in FIG. 1. This approach may be used with any of the resonant cavity filter designs that are discussed above.

Figure 7A:
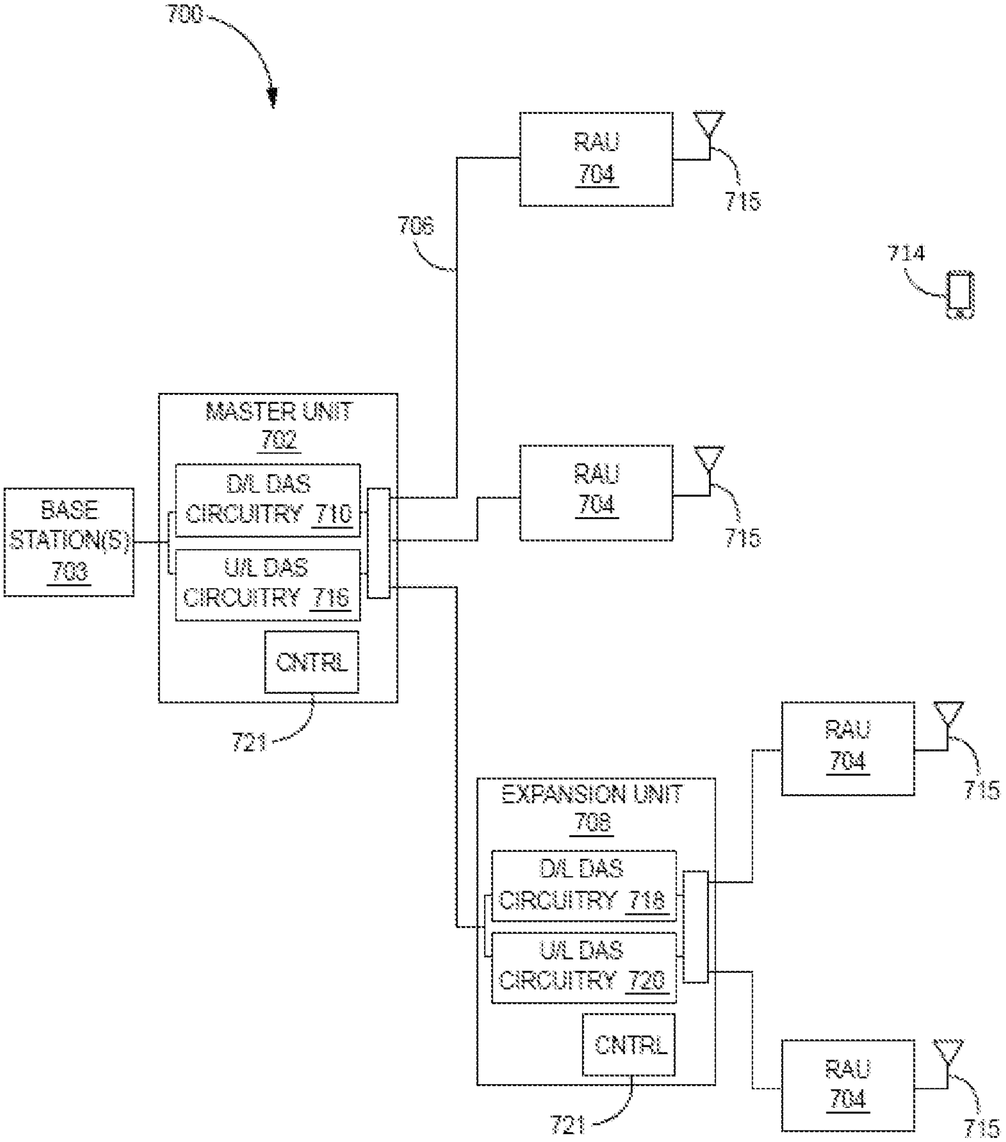
FIG. 7A is a block diagram illustrating a distributed antenna system having components that may use dielectric resonator assemblies according to embodiments of the present invention.

Using filters including the above-described dielectric resonator assemblies may improve the performance of a communications system. For example, filters and duplexers used in a distributed antenna system (DAS) may improve their performance by using the above-described dielectric resonator assemblies. FIG. 7A illustrates one embodiment of a distributed antenna system 700 that includes filters having the above-described dielectric resonator assemblies.

The DAS 700 comprises one or more master units 702 that are communicatively coupled to one or more remote antenna units (RAUs) 704 via one or more waveguides 706, e.g., optical fibers or cables. Each RAU 704 can be communicatively coupled directly to one or more of the master units 702 or indirectly via one or more other RAUs 704 and/or via one or more expansion (or other intermediary) units 708.

The DAS 700 is coupled to one or more base stations 703 and is configured to improve the wireless coverage provided by the base stations 703.

The capacity of each base station 703 can be dedicated to the DAS 700 or can be shared among the DAS 700 and a base station antenna system that is co-located with the base station 703 and/or one or more other repeater systems.

In the embodiment shown in FIG. 7A, the capacity of one or more base stations 703 is dedicated to the DAS 700 and are co-located with the DAS 700. The base stations 703 are coupled to and co-located with the DAS 700. It is to be understood, however, that other embodiments can be implemented in other ways. For example, the capacity of one or more base stations 703 can be shared with the DAS 700 and a base station antenna system co-located with the base stations 703 (for example, using a donor antenna).

The base stations 703 can provide commercial cellular wireless service and/or public and/or private safety wireless services (for example, wireless communications used by emergency services organizations (such as police, fire, and emergency medical services) to prevent or respond to incidents that harm or endanger persons or property).

The base stations 703 can be coupled to the master units 702 using a network of attenuators, combiners, splitters, amplifiers, filters, cross-connects, etc., (sometimes referred to collectively as a “point-of-interface” or “POI”). This network can be included in the master units 702 and/or can be separate from the master units 702. The coupling of the base stations 703 to the master units 702 is done so that, in the downlink, the desired set of RF channels output by the base stations 703 can be extracted, combined, and routed to the appropriate master units 702, and so that, in the upstream, the desired set of carriers output by the master units 702 can be extracted, combined, and routed to the appropriate interface of each base station 703. It is to be understood, however, that this is one example and that other embodiments can be implemented in other ways.

In general, each master unit 702 comprises downlink (D/L) DAS circuitry 710 that is configured to receive one or more downlink signals from one or more base stations 703. Each base station downlink signal includes one or more radio frequency channels used for communicating in the downlink direction with user equipment 714 over the relevant wireless air interface. Typically, each base station downlink signal is received as an analog radio frequency signal. However, in some embodiments, one or more of the base station signals are received in a digital form (for example, in a digital baseband form complying with the Common Public Radio Interface (“CPRI”) protocol, Open Radio Equipment Interface (“ORI”) protocol, the Open Base Station Standard Initiative (“OBSAI”) protocol, or other protocol).

The downlink (D/L) DAS circuitry 710 in each master unit 702 is also configured to generate one or more downlink transport signals derived from one or more base station downlink signals and to transmit one or more downlink transport signals to one or more of the RAUs 704.

Figure 7B:
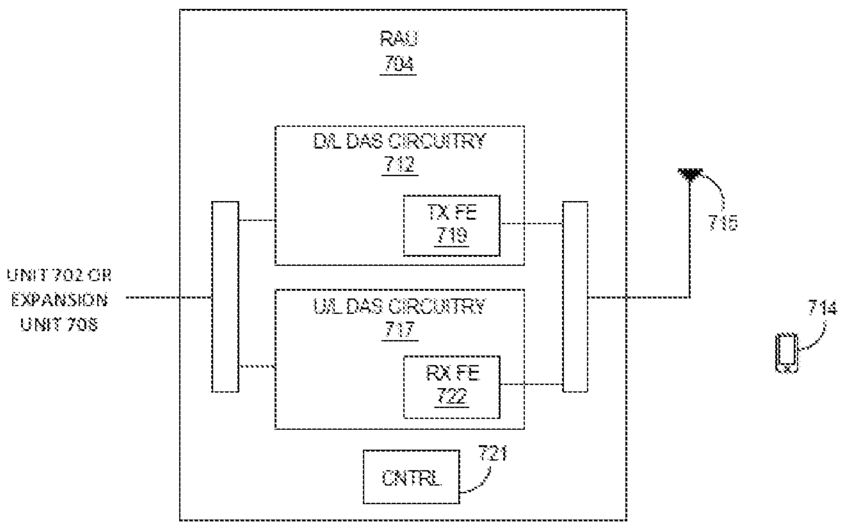
FIG. 7B is a block diagram illustrating a remote antenna unit having components that may use dielectric resonator assemblies according to embodiments of the present invention.

FIG. 7B illustrates one embodiment of a remote antenna unit in which digital pre-distortion techniques described above can be implemented. Each RAU 704 comprises downlink (D/L) DAS circuitry 712 that is configured to receive the downlink transport signals transmitted to it from one or more master units 702 and to use the received downlink transport signals to generate one or more downlink radio frequency signals that are radiated from one or more antennas 715 (also see FIG. 7A) associated with that RAU 704 for reception by user equipment 714. Each RAU 704 in FIG. 7A also includes one or more antennas 715. In this way, the DAS 700 increases the coverage area for the downlink capacity provided by the base stations 703. The downlink (D/L) DAS circuitry 712 of each RAU 704 includes at least one transmitter front end (TX FE) 719, which, for example, power amplifies the downlink radio frequency signals.

Also, each RAU 704 comprises uplink (U/L) DAS circuitry 717 that is configured to receive one or more uplink radio frequency signals transmitted from the user equipment 714. These signals are analog radio frequency signals.

The uplink DAS circuitry 717 in each RAU 704 is also configured to generate one or more uplink transport signals derived from the one or more remote uplink radio frequency signals and to transmit one or more uplink transport signals to one or more of the master units 702. The uplink DAS circuitry 717 of each RAU 704 includes at least one receiver front end (RX FE) 722, which, for example, amplifies received remote uplink radio frequency signals.

Returning to FIG. 7A, each master unit 702 comprises uplink (U/L) DAS circuitry 716 that is configured to receive the respective uplink transport signals transmitted to the master unit 702 from one or more RAUs 704 and to use the received uplink transport signals to generate one or more base station uplink radio frequency signals that are provided to the one or more base stations 703 associated with that master unit 702. Typically, this involves, among other things, combining or summing uplink signals received from multiple RAUs 704 to produce the base station signal provided to each base station 703. In this way, the DAS 700 increases the coverage area for the uplink capacity provided by the base stations 703.

Each expansion unit 708 comprises downlink DAS circuitry (D/L DAS circuitry) 718 that is configured to receive the downlink transport signals transmitted to the expansion unit 708 from the master unit 702 (or other expansion unit 708) and transmits the downlink transport signals to one or more RAUs 704 or other downstream expansion units 708. Each expansion unit 708 also comprises uplink (U/L) DAS circuitry 720 that is configured to receive the respective uplink transport signals transmitted to the expansion unit 708 from one or more RAUs 704 or other downstream expansion units 708, combine or sum the received uplink transport signals, and transmit the combined uplink transport signals upstream to the master unit 702 or other expansion unit 708. In other embodiments, one or more RAUs 704 are coupled to one or more master units 702 via one or more other RAUs 704 (for example, where the RAUs 704 are coupled together in a daisy chain or ring topology).

The downlink DAS circuitry (D/L DAS circuitry) 710 and 718 and uplink DAS circuitry (U/L DAS circuitry) 716 and 720 in each master unit 702, RAU 704, and expansion unit 708, respectively, can comprise one or more appropriate connectors, attenuators, combiners, splitters, amplifiers, filters, duplexers, multiplexers, N-plexers, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the downlink DAS circuitry 710 and 718 and uplink DAS circuitry 716 and 720 may share common circuitry and/or components. These components may implement one or more resonant cavity filters according to any of the above-described embodiments of the present invention.

The DAS 700 can use either digital transport, analog transport, or combinations of digital and analog transport for generating and communicating the transport signals between the master units 702, the RAUs 704, and any expansion units 708. Each master unit 702, RAU 704, and expansion unit 708 in the DAS 700 also comprises a respective controller (CNTRL) 721. The controller 721 is implemented using one or more programmable processors that execute software that is configured to implement the various control functions. The controller 721 (more specifically, the various control functions implemented by the controller 721) (or portions thereof) can be implemented in other ways (for example, in a field programmable gate array (FPGA), application specific integrated circuit (ASIC), etc.).

Figure 8:
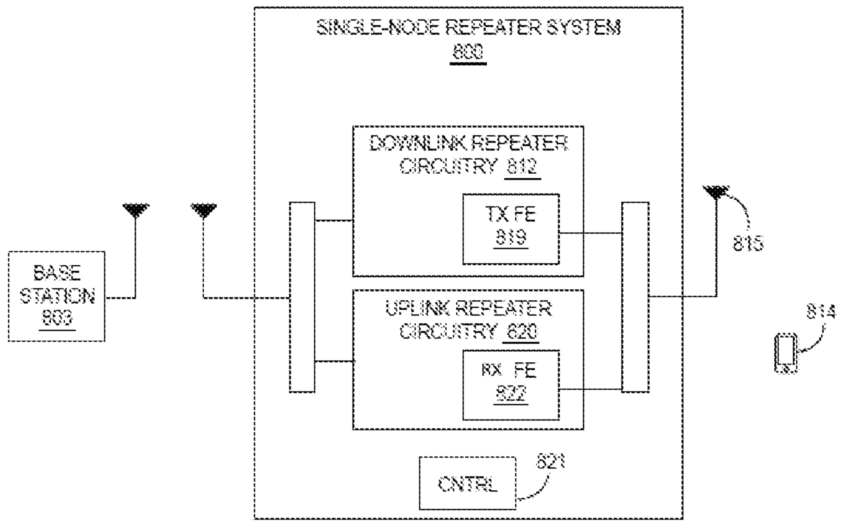
FIG. 8 is a block diagram illustrating a single-node repeater having components that may use dielectric resonator assemblies according to embodiments of the present invention.

FIG. 8 illustrates one embodiment of a single-node repeater system 800 in which components therein may include resonant cavity filters according to any of the above-described embodiments of the present invention. The single-node repeater system 800 comprises downlink repeater circuitry 812 that is configured to receive one or more downlink signals from one or more base stations 803. These signals are also referred to here as "base station downlink signals." Each base station downlink signal includes one or more radio frequency channels used for communicating in the downlink direction with user equipment (UE) 814 over the relevant wireless air interface. Typically, each base station downlink signal is received as an analog radio frequency signal.

The downlink repeater circuitry 812 in the single-node repeater system 800 is also configured to generate one or more downlink radio frequency signals that are radiated from one or more antennas 815 associated with the single-node repeater system 800 for reception by user equipment 814. These downlink radio frequency signals are analog radio frequency signals and are also referred to here as "repeated downlink radio frequency signals." Each repeated downlink radio frequency signal includes one or more of the downlink radio frequency channels used for communicating with user equipment 814 over the wireless air interface. In this exemplary embodiment, the single-node repeater system 800 is an active repeater system in which the downlink repeater circuitry 812 comprises one or more amplifiers (or other gain elements) that are used to control and adjust the gain of the repeated downlink radio frequency signals radiated from the one or more antennas 815. The downlink repeater circuitry 812 includes at least one transmitter front end (TX FE) 819, which, for example, power amplifies the repeated downlink radio frequency signals.

Also, the single-node repeater system 800 comprises uplink repeater circuitry 820 that is configured to receive one or more uplink radio frequency signals transmitted from the user equipment 814. These signals are analog radio frequency signals and are also referred to here as "UE uplink radio frequency signals." Each UE uplink radio frequency signal includes one or more radio frequency channels used for communicating in the uplink direction with user equipment 814 over the relevant wireless air interface.

The uplink repeater circuitry 820 in the single-node repeater system 800 is also configured to generate one or more uplink radio frequency signals that are provided to the one or more base stations 803. These signals are also referred to here as "repeated uplink signals." Each repeated uplink signal includes one or more of the uplink radio frequency channels used for communicating with user equipment 814 over the wireless air interface. In this exemplary embodiment, the single-node repeater system 800 is an active repeater system in which the uplink repeater circuitry 820 comprises one or more amplifiers (or other gain elements) that are used to control and adjust the gain of the repeated uplink radio frequency signals provided to the one or more base stations 803. Typically, each repeated uplink signal is provided to the one or more base stations 803 as an analog radio frequency signal. The uplink repeater circuitry 820 includes at least one receiver front end (RX FE) 822, which, for example, amplifies received uplink radio frequency signals.

The downlink repeater circuitry 812 and uplink repeater circuitry 820 can comprise one or more appropriate connectors, attenuators, combiners, splitters, amplifiers, filters, duplexers, multiplexers, N-plexers, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the downlink repeater circuitry 812 and uplink repeater circuitry 820 may share common circuitry and/or components. The components described above may include resonant cavity filters according to any of the above-described embodiments of the present invention. Also, the components may include cavities having a $TM_{01}$ dominant mode, as described above.

Further, a combination of two or more duplexers, multiplexers, N-plexers, can be used to couple the at least one transmitter front end 819 and the at least one receiver front end 822 to one or more antennas 815. The single-node repeater system 800 also comprises a controller (CNTRL) 821. The controller 821 is implemented using one or more programmable processors that execute software that is configured to implement the various control functions.

It will be appreciated that the resonant cavity filters according to embodiments of the present invention may be used to implement a wide variety of different devices including low-pass filters, high-pass filters, band-stop filters, band-pass filters, duplexers, diplexers, multiplexers, combiners and the like. It will be appreciated that the filters according to embodiments of the present invention may also be used in applications other than wireless communications systems.

The resonant cavity filters and associated dielectric resonators according to embodiments of the present invention may provide several advantages over conventional resonant cavity filters and dielectric resonators. For example, the filters may include dielectric resonators that are mounted to the filter housing without any metal-to-metal contacts. As such, the filters according to embodiments of the present invention may exhibit reduced PIM distortion as compared to conventional resonant cavity filters.

While various embodiments of the present invention have been described above, it will be appreciated that these embodiments may be changed in many ways without departing from the scope of the present invention, which is detailed in the appended claims. It will also be appreciated that the various embodiments disclosed herein may be combined in any way to create additional embodiments, all of which are within the scope of the present invention.

The present invention has been described above with reference to the accompanying drawings, in which certain embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers refer to like elements throughout.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A resonant cavity filter, comprising:

a conductive housing having a floor;

a dielectric resonator mounted to extend upwardly from the floor, the dielectric resonator comprising a cylindrical body with a tapered longitudinal bore; and a threaded dielectric fastener that is at least partially within the tapered longitudinal bore of the cylindrical body.

2. The resonant cavity filter of claim 1, wherein the threaded dielectric fastener comprises a bolt or a screw.

3. The resonant cavity filter of claim 2, wherein the floor includes a threaded opening, and wherein the threaded dielectric fastener is threadably mated with the threaded opening in the floor.

4. The resonant cavity filter of claim 2, wherein the floor includes an opening that is axially aligned with the tapered longitudinal bore, and wherein the threaded dielectric fastener is threadably mated with a second threaded fastener.

5. The resonant cavity filter of claim 1, wherein the conductive housing further comprises an upwardly extending post that is integral with the floor, wherein the upwardly extending post is internally-threaded, and wherein the threaded dielectric fastener comprises a dielectric bolt or screw that is threadably mated with the upwardly extending post.

6. The resonant cavity filter of claim 1, wherein the threaded dielectric fastener is an internally-threaded nut.

7. The resonant cavity filter of claim 1, wherein the tapered longitudinal bore has a circular transverse cross-section that increases in area with increasing distance from the conductive housing floor.

8. The resonant cavity filter of claim 1, wherein a bottom surface of the dielectric resonator directly contacts the floor.

9. The resonant cavity filter of claim 1, further comprising a tuning element that is mounted for insertion into the tapered longitudinal bore of the dielectric resonator to adjust a frequency response of the resonant cavity filter.

10. A resonant cavity filter, comprising:

a conductive housing having a floor, at least one sidewall, and a lid that define a cavity;

a threaded fastener that extends upwardly from the floor to extend into the cavity, wherein the threaded fastener and the floor comprise a monolithic structure; and a dielectric resonator that is mounted to extend upwardly from the floor via the threaded fastener, wherein the dielectric resonator comprises a cylindrical body with a longitudinal bore that has a tapered sidewall.

11. The resonant cavity filter of claim 10, wherein the threaded fastener comprises an externally-threaded fastener, and further comprising an internally-threaded dielectric fastener that is threadably-mated with the externally-threaded fastener.

12. The resonant cavity filter of claim 10, wherein the threaded fastener comprises an internally-threaded fastener, the resonant cavity filter further comprising an externally-threaded dielectric fastener that is threadably-mated with the internally-threaded fastener.

13. The resonant cavity filter of claim 12, wherein the externally-threaded dielectric fastener engages the tapered sidewall, and wherein a head of the threaded fastener has tapered sidewalls.

14. The resonant cavity filter of claim 10, wherein a bottom surface of the dielectric resonator directly contacts the floor.

15. The resonant cavity filter of claim 10, further comprising a tuning element that is mounted for insertion into the longitudinal bore of the dielectric resonator to adjust a frequency response of the resonant cavity filter.

16. A resonant cavity filter, comprising:

a conductive housing having a floor;

a dielectric resonator mounted to extend upwardly from the floor, the dielectric resonator comprising a first portion with a longitudinal bore that defines an inner sidewall, and a second portion having an internal bore axially aligned with the longitudinal bore of the first portion, wherein the first portion is a cylindrical body and the second portion is an annular dielectric disk, wherein an outer diameter of the cylindrical body is the same as an outer diameter of the annular dielectric disk, and wherein the second portion is attached to a lower surface of the first portion; and a threaded dielectric fastener that is at least partially within the longitudinal bore of the first portion and that extends through the internal bore of the second portion without contacting an inner sidewall of the internal bore of the second portion.

17. The resonant cavity filter of claim 16, wherein the first portion and the second portion comprise different materials.

18. The resonant cavity filter of claim 16, wherein the longitudinal bore of the first portion has a first transverse cross-sectional area and the internal bore of the second portion has a second transverse cross-sectional area that is less than the first transverse cross-sectional area.

19. The resonant cavity filter of claim 16, wherein the annular dielectric disk is adhesively bonded to the lower surface of the first portion.

* * * * *